United States Patent
McClellan et al.

(10) Patent No.: US 8,630,768 B2
(45) Date of Patent: Jan. 14, 2014

(54) SYSTEM AND METHOD FOR MONITORING VEHICLE PARAMETERS AND DRIVER BEHAVIOR

(75) Inventors: Scott McClellan, Heber City, UT (US); Todd Follmer, Coto de Caza, CA (US); Ed Maynard, Salt Lake City, UT (US); Eric Capps, Salt Lake City, UT (US); Gib Larson, Providence, UT (US); Dave Ord, Salt Lake City, UT (US); Richard Eyre, Salt Lake City, UT (US); Verlin Russon, Lehi, UT (US); Carleton Watkins, Lehi, UT (US); Vinh Vo, Taylorsville, UT (US); Jason Litzinger, Salt Lake City, UT (US); Steve Lawrence, Salt Lake City, UT (US)

(73) Assignee: inthinc Technology Solutions, Inc., West Valley City, UT (US)

( * ) Notice: Subject to any disclaimer, the term of this patent is extended or adjusted under 35 U.S.C. 154(b) by 1246 days.

(21) Appl. No.: 11/805,237

(22) Filed: May 22, 2007

(65) Prior Publication Data

US 2008/0262670 A1 Oct. 23, 2008

Related U.S. Application Data

(60) Provisional application No. 60/802,478, filed on May 22, 2006.

(51) Int. Cl.
*G06F 7/00* (2006.01)

(52) U.S. Cl.
USPC .............. 701/36; 701/29; 701/31.7; 705/4; 340/439

(58) Field of Classification Search
USPC ............... 701/29, 213, 2, 36, 31.7, 200, 207; 347/357.31; 705/4; 340/989, 436, 985, 340/439; 244/172.1; 342/357.51; 702/94–95
See application file for complete search history.

(56) References Cited

U.S. PATENT DOCUMENTS

| | | |
|---|---|---|
| 3,975,708 A | 8/1976 | Lusk |
| 4,369,427 A | 1/1983 | Drebinger et al. |
| 4,395,624 A | 7/1983 | Wartski |
| 4,419,654 A | 12/1983 | Funk |

(Continued)

FOREIGN PATENT DOCUMENTS

| | | |
|---|---|---|
| CA | 2071931 | 12/1993 |
| CA | 2307259 | 10/2001 |

(Continued)

OTHER PUBLICATIONS

An experiment for a 2-D and 3-D GPS/INS configuration for land vehicle applications; Phuyal, B.; Position Location and Navigation Symposium, 2004. PLANS 2004; Digital Object Identifier: 10.1109/PLANS.2004.1308987; Publication Year: 2004 , pp. 148-152.*

(Continued)

*Primary Examiner* — Cuong H Nguyen
(74) *Attorney, Agent, or Firm* — Workman Nydegger

(57) ABSTRACT

System and method for monitoring the operation of a vehicle, comprising a housing having an accelerometer unit, and a global positioning system (GPS) unit, wherein the housing is adapted to be mounted in a window of the vehicle, and wherein the system is adapted to be powered by an on-board diagnostic system of the vehicle.

28 Claims, 5 Drawing Sheets

(56) References Cited

U.S. PATENT DOCUMENTS

| | | | |
|---|---|---|---|
| 4,458,535 A | 7/1984 | Juergens | |
| 4,591,823 A | 5/1986 | Horvat | |
| 4,785,280 A | 11/1988 | Fubini | |
| 4,843,578 A | 6/1989 | Wade | |
| 4,926,417 A | 5/1990 | Futami | |
| 4,939,652 A | 7/1990 | Steiner | |
| 5,032,821 A | 7/1991 | Domanico | |
| 5,064,151 A * | 11/1991 | Cerimele et al. | 244/172.1 |
| 5,074,144 A | 12/1991 | Krofchalk et al. | |
| 5,119,504 A | 6/1992 | Durboraw, III | |
| 5,223,844 A | 6/1993 | Mansell et al. | |
| 5,225,842 A | 7/1993 | Brown et al. | |
| 5,303,163 A | 4/1994 | Ebaugh et al. | 364/550 |
| 5,305,214 A | 4/1994 | Komatsu | |
| 5,309,139 A | 5/1994 | Austin | |
| 5,311,197 A | 5/1994 | Sorden et al. | |
| 5,325,082 A | 6/1994 | Rodriguez | |
| 5,347,260 A | 9/1994 | Ginzel | |
| 5,353,023 A * | 10/1994 | Mitsugi | 340/989 |
| 5,359,528 A | 10/1994 | Haendel | |
| 5,365,114 A | 11/1994 | Tsurushima | |
| 5,365,451 A | 11/1994 | Wang et al. | |
| 5,394,136 A | 2/1995 | Lammers | |
| 5,400,018 A | 3/1995 | Scholl | |
| 5,414,432 A | 5/1995 | Penny, Jr. et al. | |
| 5,422,624 A | 6/1995 | Smith | |
| 5,424,584 A | 6/1995 | Matsuda | |
| 5,430,432 A | 7/1995 | Camhi | |
| 5,436,612 A | 7/1995 | Aduddell | |
| 5,436,837 A | 7/1995 | Gerstung | |
| 5,445,024 A * | 8/1995 | Riley et al. | 73/489 |
| 5,446,659 A | 8/1995 | Yamawaki | |
| 5,453,939 A | 9/1995 | Hoffman | |
| 5,457,439 A | 10/1995 | Kuhn | |
| 5,475,597 A | 12/1995 | Buck | |
| 5,485,116 A | 1/1996 | Cserveny et al. | |
| 5,485,161 A | 1/1996 | Vaughn | |
| 5,499,182 A | 3/1996 | Ousborne | |
| 5,521,579 A | 5/1996 | Bernhard | |
| 5,521,580 A | 5/1996 | Kaneko | |
| 5,525,960 A | 6/1996 | McCall | |
| 5,546,305 A | 8/1996 | Kondo | |
| 5,548,273 A | 8/1996 | Nicol | |
| 5,570,087 A | 10/1996 | Lemelson | |
| 5,581,464 A | 12/1996 | Woll | |
| 5,586,130 A | 12/1996 | Doyle | |
| 5,600,558 A | 2/1997 | Mearek | |
| 5,612,875 A | 3/1997 | Haendel | |
| 5,617,086 A | 4/1997 | Klashinsky et al. | |
| 5,625,337 A | 4/1997 | Medawar | |
| 5,638,077 A | 6/1997 | Martin | |
| 5,642,284 A | 6/1997 | Parupalli | |
| 5,648,755 A | 7/1997 | Yagihashi | |
| 5,659,289 A | 8/1997 | Zonkoski | |
| 5,689,067 A | 11/1997 | Klein | |
| 5,708,417 A | 1/1998 | Tallman | |
| 5,717,374 A | 2/1998 | Smith | |
| 5,719,771 A | 2/1998 | Buck | |
| 5,723,768 A | 3/1998 | Ammon | |
| 5,731,285 A | 3/1998 | Pavone et al. | |
| 5,731,785 A | 3/1998 | Lemelson et al. | |
| 5,740,548 A | 4/1998 | Hudgens | |
| 5,742,915 A | 4/1998 | Stafford | |
| 5,751,245 A | 5/1998 | Janky et al. | |
| 5,764,139 A | 6/1998 | Nojima | |
| 5,767,767 A | 6/1998 | Lima | |
| 5,777,580 A | 7/1998 | Janky et al. | |
| 5,795,997 A | 8/1998 | Gittins | |
| 5,797,134 A | 8/1998 | McMillan | |
| 5,801,618 A | 9/1998 | Jenkins | |
| 5,801,948 A | 9/1998 | Wood | |
| 5,815,071 A | 9/1998 | Doyle | |
| 5,819,198 A | 10/1998 | Peretz | |
| 5,825,283 A | 10/1998 | Camhi | |
| 5,825,284 A | 10/1998 | Dunwoody | |
| 5,829,782 A | 11/1998 | Breed et al. | |
| 5,844,475 A | 12/1998 | Horie | |
| 5,847,271 A | 12/1998 | Poublon | |
| 5,862,500 A | 1/1999 | Goodwin | |
| 5,867,093 A | 2/1999 | Dodd | |
| 5,877,678 A | 3/1999 | Donoho | |
| 5,880,674 A | 3/1999 | Ufkes | |
| 5,880,958 A * | 3/1999 | Helms et al. | 701/117 |
| 5,883,594 A | 3/1999 | Lau | |
| 5,892,434 A | 4/1999 | Carlson | |
| 5,907,277 A | 5/1999 | Tokunaga | |
| 5,914,654 A | 6/1999 | Smith | |
| 5,918,180 A | 6/1999 | Dimino | |
| 5,926,087 A | 7/1999 | Busch | |
| 5,928,291 A | 7/1999 | Jenkins et al. | |
| 5,933,080 A * | 8/1999 | Nojima | 340/426.19 |
| 5,941,915 A | 8/1999 | Federle et al. | 701/1 |
| 5,945,919 A | 8/1999 | Trask | |
| 5,949,330 A | 9/1999 | Hoffman | |
| 5,949,331 A | 9/1999 | Schofield | |
| 5,952,941 A | 9/1999 | Mardirossian | |
| 5,954,781 A | 9/1999 | Slepian | |
| 5,955,942 A | 9/1999 | Slifkin | |
| 5,957,986 A | 9/1999 | Coverdill | |
| 5,964,816 A | 10/1999 | Kincaid | |
| 5,969,600 A | 10/1999 | Tanguay | |
| 5,974,356 A | 10/1999 | Doyle et al. | |
| 5,978,737 A | 11/1999 | Pawlowski | |
| 5,982,278 A | 11/1999 | Cuvelier | |
| 5,987,976 A | 11/1999 | Sarangapani | |
| 5,999,125 A | 12/1999 | Kurby | |
| 6,002,327 A | 12/1999 | Boesch | |
| 6,008,724 A | 12/1999 | Thompson | |
| 6,018,293 A | 1/2000 | Smith | |
| 6,026,292 A | 2/2000 | Coppinger et al. | |
| 6,028,508 A | 2/2000 | Mason | |
| 6,028,510 A | 2/2000 | Tamam | |
| 6,037,861 A | 3/2000 | Ying | |
| 6,037,862 A | 3/2000 | Ying | |
| 6,038,496 A | 3/2000 | Dobler | |
| 6,044,315 A | 3/2000 | Honeck | |
| 6,059,066 A | 5/2000 | Lary | |
| 6,060,989 A | 5/2000 | Gehlot | |
| 6,064,886 A | 5/2000 | Perez et al. | |
| 6,064,928 A | 5/2000 | Wilson | |
| 6,064,970 A | 5/2000 | McMillan | |
| 6,067,008 A | 5/2000 | Smith | |
| 6,067,009 A | 5/2000 | Hozuka | |
| 6,072,388 A | 6/2000 | Kyrtsos | |
| 6,073,007 A | 6/2000 | Doyle | |
| 6,075,458 A | 6/2000 | Ladner et al. | |
| 6,078,853 A | 6/2000 | Ebner | |
| 6,081,188 A | 6/2000 | Kutlucinar | |
| 6,084,870 A | 7/2000 | Wooten et al. | |
| 6,094,149 A | 7/2000 | Wilson | |
| 6,098,048 A | 8/2000 | Dashefsky | |
| 6,100,792 A | 8/2000 | Ogino | |
| 6,104,282 A | 8/2000 | Fragoso | |
| 6,108,591 A | 8/2000 | Segal et al. | |
| 6,112,145 A * | 8/2000 | Zachman | 701/50 |
| 6,121,922 A | 9/2000 | Mohan | |
| 6,124,810 A | 9/2000 | Segal et al. | |
| 6,130,608 A | 10/2000 | McKeown | |
| 6,131,067 A | 10/2000 | Girerd et al. | |
| 6,133,827 A | 10/2000 | Alvey | |
| 6,138,516 A * | 10/2000 | Tillman | 73/649 |
| 6,141,610 A | 10/2000 | Rothert | |
| 6,147,598 A | 11/2000 | Murphy | |
| 6,161,072 A | 12/2000 | Clapper | |
| 6,172,602 B1 | 1/2001 | Hasfjord | |
| 6,178,374 B1 | 1/2001 | Möhlenkamp et al. | 701/117 |
| 6,184,784 B1 | 2/2001 | Shibuya | |
| 6,185,501 B1 | 2/2001 | Smith | |
| 6,195,015 B1 | 2/2001 | Jacobs et al. | |
| 6,198,995 B1 | 3/2001 | Settles | |
| 6,204,756 B1 | 3/2001 | Senyk | |
| 6,204,757 B1 | 3/2001 | Evans | |
| 6,208,240 B1 | 3/2001 | Ledesma | |
| 6,212,455 B1 | 4/2001 | Weaver | |

(56) References Cited

U.S. PATENT DOCUMENTS

| Patent No. | | Date | Name | Ref |
|---|---|---|---|---|
| 6,216,066 | B1 | 4/2001 | Goebel | |
| 6,222,458 | B1 | 4/2001 | Harris | |
| 6,225,898 | B1 | 5/2001 | Kamiya | |
| 6,227,862 | B1 | 5/2001 | Harkness | |
| 6,229,438 | B1 | 5/2001 | Kutlucinar | |
| 6,232,873 | B1 | 5/2001 | Dilz | |
| 6,246,933 | B1 | 6/2001 | Bague | |
| 6,247,360 | B1 | 6/2001 | Anderson | |
| 6,249,219 | B1 | 6/2001 | Perez | |
| 6,253,129 | B1 | 6/2001 | Jenkins et al. | |
| 6,255,892 | B1 | 7/2001 | Gartner | |
| 6,255,939 | B1 | 7/2001 | Roth | |
| 6,262,658 | B1 | 7/2001 | O'Connor | |
| 6,265,989 | B1 | 7/2001 | Taylor | |
| 6,266,588 | B1 | 7/2001 | McClellan | |
| 6,278,361 | B1 | 8/2001 | Magiawala | |
| 6,282,491 | B1 * | 8/2001 | Bochmann et al. | 701/209 |
| 6,285,931 | B1 | 9/2001 | Hattori | |
| 6,289,332 | B2 | 9/2001 | Menig | |
| 6,294,988 | B1 | 9/2001 | Shomura | |
| 6,294,989 | B1 | 9/2001 | Schofield | |
| 6,295,492 | B1 | 9/2001 | Lang | |
| 6,297,768 | B1 | 10/2001 | Allen, Jr. | |
| 6,301,533 | B1 | 10/2001 | Markow | |
| 6,306,063 | B1 | 10/2001 | Horgan et al. | 477/108 |
| 6,308,120 | B1 | 10/2001 | Good | |
| 6,308,134 | B1 | 10/2001 | Croyle et al. | |
| 6,313,742 | B1 | 11/2001 | Larson | |
| 6,320,497 | B1 | 11/2001 | Fukumoto | |
| 6,331,825 | B1 | 12/2001 | Ladner et al. | |
| 6,333,686 | B1 | 12/2001 | Waltzer | |
| 6,337,653 | B1 | 1/2002 | Bchler | |
| 6,339,739 | B1 | 1/2002 | Folke | |
| 6,339,745 | B1 | 1/2002 | Novik | 701/208 |
| 6,343,301 | B1 | 1/2002 | Halt et al. | |
| 6,344,805 | B1 | 2/2002 | Yasui | |
| 6,351,211 | B1 | 2/2002 | Bussard | |
| 6,356,188 | B1 | 3/2002 | Meyers | |
| 6,356,822 | B1 | 3/2002 | Diaz | |
| 6,356,833 | B2 | 3/2002 | Jeon | |
| 6,356,836 | B1 | 3/2002 | Adolph | 701/208 |
| 6,359,554 | B1 | 3/2002 | Skibinski | |
| 6,362,730 | B2 | 3/2002 | Razavi | |
| 6,362,734 | B1 | 3/2002 | McQuade | |
| 6,366,199 | B1 | 4/2002 | Osborn | |
| 6,378,959 | B2 | 4/2002 | Lesesky | |
| 6,385,533 | B1 | 5/2002 | Halt et al. | |
| 6,389,340 | B1 * | 5/2002 | Rayner | 701/35 |
| 6,393,348 | B1 | 5/2002 | Ziegler | |
| 6,401,029 | B1 | 6/2002 | Kubota et al. | |
| 6,404,329 | B1 | 6/2002 | Hsu | |
| 6,405,112 | B1 | 6/2002 | Rayner | |
| 6,405,128 | B1 | 6/2002 | Bechtolsheim et al. | 701/208 |
| 6,415,226 | B1 | 7/2002 | Kozak | 701/210 |
| 6,424,268 | B1 | 7/2002 | Isonaga | |
| 6,427,687 | B1 | 8/2002 | Kirk | |
| 6,430,488 | B1 | 8/2002 | Goldman | |
| 6,433,681 | B1 | 8/2002 | Foo | |
| 6,438,472 | B1 | 8/2002 | Tano et al. | |
| 6,441,732 | B1 | 8/2002 | Laitsaari | |
| 6,449,540 | B1 | 9/2002 | Rayner | |
| 6,459,365 | B2 | 10/2002 | Tamura | |
| 6,459,367 | B1 | 10/2002 | Green | |
| 6,459,369 | B1 | 10/2002 | Wang | |
| 6,459,961 | B1 | 10/2002 | Obradovich | |
| 6,459,969 | B1 | 10/2002 | Bates | |
| 6,462,675 | B1 | 10/2002 | Humphrey | |
| 6,472,979 | B2 | 10/2002 | Schofield | |
| 6,476,763 | B2 | 11/2002 | Allen, Jr. | |
| 6,480,106 | B1 | 11/2002 | Crombez | |
| 6,484,035 | B2 | 11/2002 | Allen, Jr. | |
| 6,484,091 | B2 | 11/2002 | Shibata | |
| 6,493,650 | B1 | 12/2002 | Rodgers | |
| 6,512,969 | B1 | 1/2003 | Wang | |
| 6,515,596 | B2 | 2/2003 | Awada | |
| 6,519,512 | B1 | 2/2003 | Haas | |
| 6,525,672 | B2 | 2/2003 | Chainer | |
| 6,526,341 | B1 | 2/2003 | Bird et al. | |
| 6,529,159 | B1 | 3/2003 | Fan et al. | |
| 6,535,116 | B1 | 3/2003 | Zhou | |
| 6,542,074 | B1 | 4/2003 | Tharman | |
| 6,542,794 | B2 | 4/2003 | Obradovich | |
| 6,549,834 | B2 | 4/2003 | McClellan | |
| 6,552,682 | B1 | 4/2003 | Fan | |
| 6,556,905 | B1 | 4/2003 | Mittelsteadt | |
| 6,559,769 | B2 | 5/2003 | Anthony | |
| 6,564,126 | B1 | 5/2003 | Lin | |
| 6,567,000 | B2 | 5/2003 | Slifkin | |
| 6,571,168 | B1 | 5/2003 | Murphy | |
| 6,587,759 | B2 | 7/2003 | Obradovich | |
| 6,594,579 | B1 | 7/2003 | Lowrey | |
| 6,599,243 | B2 | 7/2003 | Woltermann | |
| 6,600,985 | B2 | 7/2003 | Weaver | |
| 6,604,033 | B1 | 8/2003 | Banet | |
| 6,609,063 | B1 | 8/2003 | Bender et al. | 701/209 |
| 6,609,064 | B1 | 8/2003 | Dean | 701/213 |
| 6,611,740 | B2 | 8/2003 | Lowrey | |
| 6,611,755 | B1 | 8/2003 | Coffee | |
| 6,615,137 | B2 * | 9/2003 | Lutter et al. | 701/301 |
| 6,622,085 | B1 | 9/2003 | Amita et al. | 701/208 |
| 6,629,029 | B1 | 9/2003 | Giles | |
| 6,630,884 | B1 | 10/2003 | Shanmugham | |
| 6,631,322 | B1 | 10/2003 | Arthur et al. | 701/211 |
| 6,636,790 | B1 | 10/2003 | Lightner | |
| 6,639,512 | B1 | 10/2003 | Lee | |
| 6,643,578 | B2 | 11/2003 | Levine | |
| 6,651,001 | B2 | 11/2003 | Apsell | |
| 6,654,682 | B2 | 11/2003 | Kane et al. | |
| 6,657,540 | B2 | 12/2003 | Knapp | |
| 6,662,013 | B2 | 12/2003 | Takiguchi et al. | |
| 6,662,141 | B2 | 12/2003 | Kaub | 702/181 |
| 6,664,922 | B1 | 12/2003 | Fan | |
| 6,665,613 | B2 | 12/2003 | Duvall | |
| 6,674,362 | B2 | 1/2004 | Yoshioka | |
| 6,675,085 | B2 | 1/2004 | Straub | |
| 6,677,854 | B2 | 1/2004 | Dix | |
| 6,678,612 | B1 | 1/2004 | Khawam | |
| 6,696,932 | B2 | 2/2004 | Skibinski | |
| 6,701,234 | B1 | 3/2004 | Vogelsang | |
| 6,703,925 | B2 | 3/2004 | Steffel | |
| 6,710,738 | B2 | 3/2004 | Allen, Jr. | |
| 6,714,894 | B1 | 3/2004 | Tobey et al. | 702/188 |
| 6,718,235 | B1 | 4/2004 | Borugian | |
| 6,718,239 | B2 | 4/2004 | Rayner | |
| 6,720,889 | B2 | 4/2004 | Yamaki et al. | |
| 6,727,809 | B1 | 4/2004 | Smith | |
| 6,728,542 | B2 | 4/2004 | Meda | |
| 6,728,605 | B2 | 4/2004 | Lash | |
| 6,732,031 | B1 | 5/2004 | Lightner | |
| 6,732,032 | B1 | 5/2004 | Banet | |
| 6,737,962 | B2 | 5/2004 | Mayor | |
| 6,741,169 | B2 | 5/2004 | Magiawala | |
| 6,741,170 | B2 | 5/2004 | Alrabady | |
| 6,745,153 | B2 | 6/2004 | White | |
| 6,748,322 | B1 | 6/2004 | Fernandez | |
| 6,750,761 | B1 | 6/2004 | Newman | |
| 6,750,762 | B1 | 6/2004 | Porter | |
| 6,756,916 | B2 | 6/2004 | Yanai | |
| 6,759,952 | B2 | 7/2004 | Dunbridge | |
| 6,766,244 | B2 | 7/2004 | Obata et al. | 701/207 |
| 6,768,448 | B2 | 7/2004 | Farmer | |
| 6,775,602 | B2 | 8/2004 | Gordon | |
| 6,778,068 | B2 | 8/2004 | Wolfe | |
| 6,778,885 | B2 | 8/2004 | Agashe et al. | |
| 6,784,793 | B2 | 8/2004 | Gagnon | |
| 6,784,832 | B2 | 8/2004 | Knockeart et al. | |
| 6,788,196 | B2 | 9/2004 | Ueda | |
| 6,788,207 | B2 | 9/2004 | Wilkerson | |
| 6,792,339 | B2 | 9/2004 | Basson | |
| 6,795,017 | B1 | 9/2004 | Puranik et al. | |
| 6,798,354 | B2 | 9/2004 | Schuessler | |
| 6,803,854 | B1 | 10/2004 | Adams et al. | |
| 6,807,481 | B1 | 10/2004 | Gastelum | |
| 6,813,549 | B2 | 11/2004 | Good | |

(56) References Cited

U.S. PATENT DOCUMENTS

| | | | |
|---|---|---|---|
| 6,819,236 B2 | 11/2004 | Kawai | |
| 6,822,557 B1 | 11/2004 | Weber | |
| 6,832,141 B2 | 12/2004 | Skeen et al. | |
| 6,845,314 B2 | 1/2005 | Fosseen | |
| 6,845,316 B2 | 1/2005 | Yates | 701/117 |
| 6,845,317 B2 | 1/2005 | Craine | |
| 6,847,871 B2 | 1/2005 | Malik et al. | 701/33 |
| 6,847,872 B2 | 1/2005 | Bodin | |
| 6,847,873 B1 | 1/2005 | Li | |
| 6,847,887 B1 | 1/2005 | Casino | 701/208 |
| 6,850,841 B1 | 2/2005 | Casino | 701/208 |
| 6,859,039 B2 | 2/2005 | Horie | |
| 6,859,695 B2 | 2/2005 | Klausner | |
| 6,865,457 B1 | 3/2005 | Mittelsteadt | |
| 6,867,733 B2 | 3/2005 | Sandhu et al. | |
| 6,868,386 B1 | 3/2005 | Henderson | |
| 6,870,469 B2 | 3/2005 | Ueda | |
| 6,873,253 B2 | 3/2005 | Veziris | |
| 6,873,261 B2 | 3/2005 | Anthony | |
| 6,879,894 B1 | 4/2005 | Lightner | |
| 6,885,293 B2 | 4/2005 | Okumura | |
| 6,888,495 B2 | 5/2005 | Flick | |
| 6,892,131 B2 | 5/2005 | Coffee | |
| 6,894,606 B2 | 5/2005 | Forbes et al. | 340/435 |
| 6,895,332 B2 | 5/2005 | King | |
| 6,909,398 B2 | 6/2005 | Knockeart et al. | |
| 6,909,947 B2 | 6/2005 | Douros et al. | |
| 6,914,523 B2 | 7/2005 | Munch | |
| 6,922,133 B2 | 7/2005 | Wolfe | |
| 6,922,616 B2 | 7/2005 | Obradovich | |
| 6,922,622 B2 | 7/2005 | Dulin | |
| 6,925,425 B2 | 8/2005 | Remboski | |
| 6,928,348 B1 | 8/2005 | Lightner | |
| 6,937,162 B2 | 8/2005 | Tokitsu | |
| 6,950,013 B2 | 9/2005 | Scaman | |
| 6,954,140 B2 | 10/2005 | Holler | |
| 6,957,133 B1 * | 10/2005 | Hunt et al. | 701/29 |
| 6,958,976 B2 | 10/2005 | Kikkawa | |
| 6,960,168 B2 | 11/2005 | Yanagidaira et al. | |
| 6,965,827 B1 | 11/2005 | Wolfson | 701/207 |
| 6,968,311 B2 | 11/2005 | Knockeart et al. | |
| 6,970,075 B2 | 11/2005 | Cherouny | |
| 6,970,783 B2 | 11/2005 | Knockeart et al. | |
| 6,972,669 B2 | 12/2005 | Saito | |
| 6,980,131 B1 | 12/2005 | Taylor | |
| 6,981,565 B2 | 1/2006 | Gleacher | |
| 6,982,636 B1 | 1/2006 | Bennie | |
| 6,983,200 B2 | 1/2006 | Bodin | |
| 6,988,033 B1 | 1/2006 | Lowrey | |
| 6,988,034 B1 | 1/2006 | Marlatt et al. | 701/200 |
| 6,989,739 B2 | 1/2006 | Li | |
| 7,002,454 B1 | 2/2006 | Gustafson | |
| 7,002,579 B2 | 2/2006 | Olson | |
| 7,005,975 B2 | 2/2006 | Lehner | |
| 7,006,820 B1 | 2/2006 | Parker et al. | |
| 7,019,641 B1 | 3/2006 | Lakshmanan | |
| 7,023,321 B2 | 4/2006 | Brillon et al. | |
| 7,023,332 B2 | 4/2006 | Saito | |
| 7,024,318 B2 | 4/2006 | Fischer | |
| 7,027,808 B2 | 4/2006 | Wesby | |
| 7,034,705 B2 | 4/2006 | Yoshioka | |
| 7,038,578 B2 | 5/2006 | Will | |
| 7,042,347 B2 | 5/2006 | Cherouny | |
| 7,047,114 B1 | 5/2006 | Rogers | |
| 7,049,941 B2 | 5/2006 | Rivera-Cintron | |
| 7,054,742 B2 | 5/2006 | Khavakh et al. | 701/209 |
| 7,059,689 B2 | 6/2006 | Lesesky | |
| 7,069,126 B2 | 6/2006 | Bernard | |
| 7,069,134 B2 | 6/2006 | Williams | |
| 7,072,753 B2 | 7/2006 | Eberle | |
| 7,081,811 B2 | 7/2006 | Johnston | |
| 7,084,755 B1 | 8/2006 | Nord | |
| 7,088,225 B2 | 8/2006 | Yoshioka | |
| 7,089,116 B2 | 8/2006 | Smith | |
| 7,091,880 B2 | 8/2006 | Sorensen | |
| 7,098,812 B2 | 8/2006 | Hirota | |
| 7,099,750 B2 | 8/2006 | Miyazawa | |
| 7,099,774 B2 | 8/2006 | King | |
| 7,102,496 B1 | 9/2006 | Ernst | |
| 7,109,853 B1 | 9/2006 | Mattson | |
| 7,113,081 B1 | 9/2006 | Reichow | |
| 7,113,107 B2 | 9/2006 | Taylor | |
| 7,113,127 B1 * | 9/2006 | Banet et al. | 342/357.31 |
| 7,117,075 B1 | 10/2006 | Larschan et al. | |
| 7,119,696 B2 | 10/2006 | Borugian | |
| 7,124,027 B1 | 10/2006 | Ernst | |
| 7,124,088 B2 | 10/2006 | Bauer et al. | |
| 7,129,825 B2 | 10/2006 | Weber | |
| 7,132,934 B2 | 11/2006 | Allison | |
| 7,132,937 B2 | 11/2006 | Lu | |
| 7,132,938 B2 | 11/2006 | Suzuki | |
| 7,133,755 B2 | 11/2006 | Salman | |
| 7,135,983 B2 | 11/2006 | Filippov | |
| 7,138,916 B2 | 11/2006 | Schwartz | |
| 7,139,661 B2 | 11/2006 | Holze | |
| 7,145,442 B1 | 12/2006 | Wai | |
| 7,149,206 B2 | 12/2006 | Pruzan | |
| 7,155,259 B2 | 12/2006 | Bauchot et al. | |
| 7,155,321 B2 | 12/2006 | Bromley et al. | 701/29 |
| 7,161,473 B2 | 1/2007 | Hoshal | |
| 7,164,986 B2 | 1/2007 | Humphries | |
| 7,170,390 B2 | 1/2007 | Quiñones | |
| 7,170,400 B2 | 1/2007 | Cowelchuk | |
| 7,174,243 B1 | 2/2007 | Lightner | |
| 7,176,813 B2 | 2/2007 | Kawamata et al. | |
| 7,180,407 B1 | 2/2007 | Guo | |
| 7,180,409 B2 | 2/2007 | Brey | |
| 7,187,271 B2 | 3/2007 | Nagata | |
| 7,196,629 B2 | 3/2007 | Ruoss | |
| 7,197,500 B1 | 3/2007 | Israni et al. | 707/100 |
| 7,216,022 B2 | 5/2007 | Kynast et al. | 701/1 |
| 7,216,035 B2 | 5/2007 | Hörtner | |
| 7,218,211 B2 | 5/2007 | Ho | |
| 7,222,009 B2 | 5/2007 | Hijikata | |
| 7,225,060 B2 * | 5/2007 | O'Connor et al. | 701/1 |
| 7,225,065 B1 | 5/2007 | Hunt | |
| 7,228,211 B1 | 6/2007 | Lowrey | |
| 7,233,235 B2 | 6/2007 | Pavlish | |
| 7,236,862 B2 | 6/2007 | Kanno | |
| 7,239,948 B2 | 7/2007 | Nimmo | |
| 7,256,686 B2 | 8/2007 | Koutsky | |
| 7,256,700 B1 | 8/2007 | Ruocco | |
| 7,256,702 B2 | 8/2007 | Isaacs | |
| 7,260,497 B2 | 8/2007 | Watabe | |
| RE39,845 E | 9/2007 | Hasfjord | |
| 7,269,507 B2 | 9/2007 | Cayford | 701/208 |
| 7,269,530 B1 | 9/2007 | Lin | |
| 7,271,716 B2 | 9/2007 | Nou | |
| 7,273,172 B2 | 9/2007 | Olsen | |
| 7,280,046 B2 | 10/2007 | Berg | |
| 7,283,904 B2 | 10/2007 | Benjamin | |
| 7,286,917 B2 | 10/2007 | Hawkins | |
| 7,286,929 B2 | 10/2007 | Staton | |
| 7,289,024 B2 | 10/2007 | Sumcad | |
| 7,289,035 B2 | 10/2007 | Nathan | |
| 7,292,152 B2 | 11/2007 | Torkkola | |
| 7,292,159 B2 | 11/2007 | Culpepper | |
| 7,295,921 B2 | 11/2007 | Spencer et al. | |
| 7,298,248 B2 | 11/2007 | Finley | |
| 7,298,249 B2 | 11/2007 | Avery | |
| 7,301,445 B2 | 11/2007 | Moughler | |
| 7,317,383 B2 | 1/2008 | Ihara | |
| 7,317,392 B2 | 1/2008 | DuRocher | |
| 7,317,927 B2 | 1/2008 | Staton | |
| 7,319,848 B2 | 1/2008 | Obradovich | |
| 7,321,294 B2 | 1/2008 | Mizumaki | |
| 7,321,825 B2 | 1/2008 | Ranalli | |
| 7,323,972 B2 | 1/2008 | Nobusawa | |
| 7,323,974 B2 | 1/2008 | Schmid | |
| 7,323,982 B2 | 1/2008 | Staton | |
| 7,327,239 B2 | 2/2008 | Gallant | |
| 7,327,258 B2 | 2/2008 | Fast | |
| 7,333,883 B2 | 2/2008 | Geborek | |
| 7,339,460 B2 | 3/2008 | Lane | |

(56) References Cited

U.S. PATENT DOCUMENTS

| | | | |
|---|---|---|---|
| 7,349,782 B2 | 3/2008 | Churchill | |
| 7,352,081 B2 | 4/2008 | Taurasi | |
| 7,355,508 B2 | 4/2008 | Mian | |
| 7,362,239 B2 | 4/2008 | Franczyk et al. | |
| 7,365,639 B2 | 4/2008 | Yuhara | |
| 7,366,551 B1 | 4/2008 | Hartley | |
| 7,375,624 B2 | 5/2008 | Hines | |
| 7,376,499 B2 | 5/2008 | Salman | |
| 7,378,946 B2 | 5/2008 | Lahr | |
| 7,378,949 B2 | 5/2008 | Chen | |
| 7,386,394 B2 | 6/2008 | Shulman | |
| 7,398,153 B2 | 7/2008 | Workman et al. | |
| 7,421,334 B2 | 9/2008 | Dahlgren et al. | 701/117 |
| 7,433,889 B1 | 10/2008 | Barton | 707/104.1 |
| 7,447,509 B2 | 11/2008 | Cossins et al. | 455/457 |
| 7,474,264 B2 | 1/2009 | Bolduc et al. | |
| 7,474,269 B2 | 1/2009 | Mayer et al. | |
| 7,495,547 B2 * | 2/2009 | Lich et al. | 340/425.5 |
| 7,499,949 B2 | 3/2009 | Barton | 707/104.1 |
| 7,565,230 B2 | 7/2009 | Gardner et al. | 701/35 |
| 7,584,033 B2 | 9/2009 | Mittelsteadt et al. | |
| 7,589,643 B2 | 9/2009 | Dagei et al. | |
| 7,660,658 B2 | 2/2010 | Sheynblat | |
| 7,671,727 B2 | 3/2010 | Flick | |
| 7,697,917 B2 | 4/2010 | Camp et al. | |
| 7,739,036 B2 | 6/2010 | Grimm et al. | |
| 7,747,410 B2 * | 6/2010 | Van Esch | 702/150 |
| 7,783,406 B2 | 8/2010 | Rothschild | |
| 7,821,421 B2 | 10/2010 | Tamir et al. | |
| 7,859,392 B2 | 12/2010 | McClellan et al. | |
| 7,880,642 B2 | 2/2011 | Gueziec | 340/905 |
| 7,898,388 B2 | 3/2011 | Ehrman et al. | 340/5.8 |
| 7,941,258 B1 | 5/2011 | Mittelsteadt et al. | 701/35 |
| 8,188,887 B2 | 5/2012 | Catten et al. | |
| 2001/0018628 A1 | 8/2001 | Jenkins et al. | 701/35 |
| 2001/0048364 A1 | 12/2001 | Kalthoff et al. | |
| 2002/0019703 A1 | 2/2002 | Levine | |
| 2002/0024444 A1 | 2/2002 | Hiyama et al. | 340/576 |
| 2002/0111725 A1 | 8/2002 | Burge | |
| 2002/0111844 A1 | 8/2002 | Vanstory et al. | |
| 2002/0126023 A1 | 9/2002 | Awada | |
| 2002/0128000 A1 | 9/2002 | do Nascimento | |
| 2003/0055555 A1 | 3/2003 | Knockeart et al. | |
| 2003/0060950 A1 | 3/2003 | McKeown et al. | |
| 2003/0134660 A1 | 7/2003 | Himmel et al. | |
| 2003/0191564 A1 * | 10/2003 | Haugse et al. | 701/29 |
| 2004/0039504 A1 | 2/2004 | Coffee et al. | |
| 2004/0056779 A1 * | 3/2004 | Rast | 340/985 |
| 2004/0066330 A1 | 4/2004 | Knockeart et al. | |
| 2004/0077339 A1 | 4/2004 | Martens | |
| 2004/0083041 A1 | 4/2004 | Skeen et al. | |
| 2004/0107037 A1 | 6/2004 | Straub | |
| 2004/0142672 A1 | 7/2004 | Stankewitz | |
| 2004/0153362 A1 | 8/2004 | Bauer et al. | |
| 2004/0176083 A1 | 9/2004 | Shiao et al. | |
| 2004/0210353 A1 | 10/2004 | Rice | 701/1 |
| 2004/0236474 A1 | 11/2004 | Chowdhary et al. | 701/1 |
| 2004/0236475 A1 | 11/2004 | Chowdhary | |
| 2004/0254698 A1 | 12/2004 | Hubbard et al. | |
| 2004/0260579 A1 | 12/2004 | Tremiti | |
| 2005/0021270 A1 | 1/2005 | Hong et al. | |
| 2005/0064835 A1 | 3/2005 | Gusler | |
| 2005/0065711 A1 | 3/2005 | Dahlgren et al. | |
| 2005/0070245 A1 | 3/2005 | Nath et al. | |
| 2005/0091018 A1 | 4/2005 | Craft | |
| 2005/0091175 A9 | 4/2005 | Farmer | |
| 2005/0096809 A1 | 5/2005 | Skeen et al. | |
| 2005/0107944 A1 | 5/2005 | Hovestadt et al. | |
| 2005/0119002 A1 | 6/2005 | Bauchot et al. | |
| 2005/0131597 A1 | 6/2005 | Raz et al. | |
| 2005/0137757 A1 | 6/2005 | Phelan et al. | |
| 2005/0143903 A1 | 6/2005 | Park et al. | |
| 2005/0171663 A1 | 8/2005 | Mittelsteadt et al. | |
| 2005/0184860 A1 | 8/2005 | Taruki et al. | |
| 2005/0273218 A1 * | 12/2005 | Breed et al. | 701/2 |
| 2006/0022842 A1 | 2/2006 | Zoladeck et al. | |
| 2006/0025894 A1 * | 2/2006 | O'Connor et al. | 701/1 |
| 2006/0112573 A1 * | 6/2006 | Hillman et al. | 33/203 |
| 2006/0121951 A1 | 6/2006 | Perdomo et al. | |
| 2006/0154687 A1 | 7/2006 | McDowell | |
| 2006/0208169 A1 * | 9/2006 | Breed et al. | 250/221 |
| 2006/0220905 A1 | 10/2006 | Hovestadt | |
| 2006/0224306 A1 | 10/2006 | Workman et al. | |
| 2006/0234711 A1 | 10/2006 | McArdle | |
| 2006/0253307 A1 | 11/2006 | Warren et al. | |
| 2007/0005404 A1 | 1/2007 | Raz et al. | |
| 2007/0057781 A1 | 3/2007 | Breed | |
| 2007/0061155 A1 | 3/2007 | Ji et al. | |
| 2007/0126601 A1 | 6/2007 | Park | |
| 2007/0139189 A1 | 6/2007 | Helmig | |
| 2007/0186923 A1 | 8/2007 | Poutiatine et al. | |
| 2007/0202929 A1 | 8/2007 | Satake | |
| 2007/0229234 A1 | 10/2007 | Smith | |
| 2007/0260363 A1 | 11/2007 | Miller | |
| 2007/0293206 A1 | 12/2007 | Lund | |
| 2008/0059055 A1 | 3/2008 | Geelen et al. | |
| 2008/0064413 A1 | 3/2008 | Breed | |
| 2008/0082221 A1 | 4/2008 | Nagy | |
| 2008/0120175 A1 | 5/2008 | Doering | |
| 2008/0252487 A1 | 10/2008 | McClellan et al. | |
| 2008/0255722 A1 * | 10/2008 | McClellan et al. | 701/35 |
| 2008/0255888 A1 | 10/2008 | Berkobin | |
| 2008/0258890 A1 | 10/2008 | Follmer et al. | |
| 2008/0294690 A1 | 11/2008 | McClellan et al. | |
| 2008/0296968 A1 * | 12/2008 | Culbert | 303/20 |
| 2008/0319602 A1 | 12/2008 | McClellan et al. | |
| 2009/0024273 A1 | 1/2009 | Follmer et al. | |
| 2009/0024419 A1 | 1/2009 | McClellan et al. | |
| 2009/0079555 A1 | 3/2009 | Aguirre De Carcer et al. | |
| 2009/0085728 A1 | 4/2009 | Catten | |
| 2010/0130182 A1 | 5/2010 | Rosen | |
| 2010/0131189 A1 | 5/2010 | Geelen et al. | |
| 2010/0134182 A1 | 6/2010 | Kapoor et al. | |
| 2010/0207751 A1 | 8/2010 | Follmer et al. | |
| 2010/0207787 A1 | 8/2010 | Catten et al. | |
| 2011/0115618 A1 | 5/2011 | Catten | |
| 2011/0267205 A1 | 11/2011 | McClellan et al. | |
| 2012/0181765 A1 * | 7/2012 | Hill et al. | 280/62 |

FOREIGN PATENT DOCUMENTS

| | | | |
|---|---|---|---|
| CA | 2631103 A1 * | 11/2008 | |
| DE | 197 00 353 A1 | 7/1998 | B60K 28/00 |
| EP | 0843177 | 5/1998 | |
| EP | 0921509 | 6/1999 | |
| EP | 1811481 | 7/2007 | |
| GB | 2434346 | 7/2007 | |
| GB | 2454224 A * | 5/2009 | |
| JP | 2004326492 | 11/2004 | |
| JP | 2005-223791 | 8/2005 | |
| JP | 2005-250825 | 9/2005 | |
| JP | 2007235530 | 9/2007 | |
| WO | WO 2004019646 | 3/2004 | |
| WO | WO 2005003885 | 1/2005 | |
| WO | WO 2005019273 | 11/2005 | |
| WO | WO2005109369 | 11/2005 | |
| WO | WO 2008045320 A3 * | 8/2008 | |
| WO | WO2008109477 | 9/2008 | |
| WO | WO 2013033756 A1 * | 3/2013 | |
| WO | WO 2013050548 A1 * | 4/2013 | |

OTHER PUBLICATIONS

Position control of VTOL UAVs using IMU and GPS measurements; Roberts, Andrew; Tayebi, Abdelhamid; Decision and Control and European Control Conference (CDC-ECC), 2011 50th IEEE Conference on; Digital Object Identifier: 10.1109/CDC.2011.6160854; Publication Year: 2011 , pp. 8082-8087.*

Observability analysis of the INS/GPS navigation system on the measurements in land vehicle applications; Seong Yun Cho; Byung Doo Kim; Young Su Cho; Wan Sik Choi; Control, Automation and Systems, 2007. ICCAS '07. International Conference on Digital Object Identifier: 10.1109/ICCAS.2007.4407018; Publication Year: 2007 , pp. 841-846.*

(56) References Cited

OTHER PUBLICATIONS

The practical design of in-vehicle telematics device with GPS and MEMS accelerometers; Vukajlovic, M.B.; Tadic, S.; Dramicanin, D.M.; Telecommunications Forum (TELFOR), 2011 19th; Digital Object Identifier: 10.1109/TELFOR.2011.6143692 Publication Year: 2011, pp. 908-911.*

A Small Low-Cost Hybrid Orientation System and Its Error Analysis, Rong Zhu; Zhaoying Zhou; Sensors Journal, IEEE—vol. 9, Issue: 3; Digital Object Identifier: 10.1109/JSEN.2008.2012196; Publication Year: 2009, pp. 223-230.*

Full auto-calibration of a smartphone on board a vehicle using IMU and GPS embedded sensors; Almazan, Javier; Bergasa, Luis M.; Yebes, J.Javier; Barea, Rafael; Arroyo, Roberto; Intelligent Vehicles Symposium (IV), 2013 IEEE; Digital Object Identifier: 10.1109/IVS.2013.6629658; Publication Year: 2013, pp. 1374-1380.*

Efficient integration of inertial observations into visual SLAM without initialization; Lupton, T.; Sukkarieh, S.; Intelligent Robots and Systems, 2009. IROS 2009. IEEE/RSJ International Conference on; Digital Object Identifier: 10.1109/IROS.2009.5354267 Publication Year: 2009, pp. 1547-1552.*

Attitude and Heading System based on EKF total state configuration; Munguia, R.; Grau, A.; Industrial Electronics (ISIE), 2011 IEEE International Symposium on; Digital Object Identifier: 10.1109/ISIE.2011.5984493; Publication Year: 2011, pp. 2147-2152.*

Application of inertial navigation systems to geodetic postion and gravity vector survey; Huddle, J.R.; Decision and Control including the 17th Symposium on Adaptive Processes, 1978 IEEE Conference on; vol. 17, Part: 1; Digital Object Identifier: 10.1109/CDC.1978.267967; Publication Year: 1978, pp. 459-465.*

Attitude measurement of driver's head based on accelerometer and magnetoresistive sensor; Zhao Yan; Liman Yang; Qi Zheng; Yunhua Li; Fluid Power and Mechatronics (FPM), 2011 International Conference on; Digital Object Identifier: 10.1109/FPM.2011.6045836; Publication Year: 2011, pp. 613-617.*

Ogle, et al.; *Accuracy of Global Positioning System for Determining Driver Performance Parameters*; Transportation Research Record 1818; Paper No. 02-1063; pp. 12-24.

Shen, et al.; *A computer Assistant for Vehicle Dispatching with Learning Capabilities*; Annals of Operations Research 61; pp. 189-211, 1995.

Tijerina, et al.; *Final Report Supplement; Heavy Vehicle Driver Workload Assessment; Task 5: Workload Assessment Protocol*; U.S. Department of Transportation; 69 pages, Oct. 1996.

Myra Blanco; *Effects of In-Vehicle Information System(IVIS) Tasks on the Information Processing Demands of a Commercial Vehicle Operations(CVO) Driver*; 230 pages, 1999.

U.S. Appl. No. 11/805,238, Jul. 30, 2009, Office Action.
U.S. Appl. No. 11/755,556, Sep. 1, 2009, Office Action.
U.S. Appl. No. 11/779,176, Mar. 17, 2010, Office Action.
U.S. Appl. No. 11/805,238, Apr. 26, 2010, Notice of Allowance.
U.S. Appl. No. 11/755,556, May 4, 2010, Office Action.
U.S. Appl. No. 11/758,444, Jul. 20, 2010, Office Action.
U.S. Appl. No. 11/768,056, Jan. 18, 2011, Office Action.
U.S. Appl. No. 13/012,660, Feb. 16, 2011, Office Action.
U.S. Appl. No. 12/379,153, Jul. 29, 2011, Office Action.
U.S. Appl. No. 12/379,154, Aug. 1, 2011, Office Action.
U.S. Appl. No. 11/779,176, Aug. 18, 2011, Office Action.
U.S. Appl. No. 11/768,056, Sep. 16, 2011, Office Action.
U.S. Appl. No. 13/012,660, Nov. 14, 2011, Office Action.
U.S. Appl. No. 12/379,153, Dec. 16, 2011, Office Action.
U.S. Appl. No. 12/379,154, Jan. 30, 2012, Notice of Allowance.
U.S. Appl. No. 11/768,056, Feb. 16, 2012, Office Action.
U.S. Appl. No. 13/012,660, Apr. 11, 2012, Office Action.
U.S. Appl. No. 11/768,056, Jul. 19, 2012, Office Action.
U.S. Appl. No. 12/379,153, Jul. 31, 2012, Notice of Allowance.
U.S. Appl. No. 13/012,660, Aug. 1, 2012, Office Action.
U.S. Appl. No. 13/012,660, Nov. 26, 2012, Office Action.
U.S. Appl. No. 11/779,176, Dec. 3, 2012, Office Action.
U.S. Appl. No. 13/012,660, Mar. 18, 2013, Office Action.
U.S. Appl. No. 11/768,056, Jun. 21, 2013, Office Action.
U.S. Appl. No. 11/779,176, Jul. 1, 2013, Notice of Allowance.
U.S. Appl. No. 13/012,660, Jul. 8, 2013, Office Action.
U.S. Appl. No. 12/379,153, Aug. 14, 2013, Notice of Allowance.
U.S. Appl. No. 12/975,489, Oct. 3, 2013, Office Action.

* cited by examiner

SYSTEM AND METHOD FOR MONITORING VEHICLE PARAMETERS AND DRIVER BEHAVIOR

This application claims the benefit of U.S. Provisional Application No. 60/802,478, filed on May 22, 2006, entitled Driver Behavior Monitoring System, which application is hereby incorporated herein by reference.

TECHNICAL FIELD

The present invention relates generally to a system and method for monitoring driver behavior and vehicle driving conditions and, more particularly, to a system and method for a driver and a vehicle using an easily installed unit.

BACKGROUND

The present invention relates generally to asset management and, more particularly, to a fleet management system incorporating comprehensive driver monitoring/mentoring and asset monitoring capabilities in order to improve driver safety and reduce fuel and maintenance costs across a fleet of vehicles. Advantageously, the fleet management system is fully-configurable at all times including during installation of the system as well as during operation thereof. In addition, the present invention relates to a system and method for monitoring driver behavior for use by consumers or the general public such that parents may remotely mentor the driving habits of their teen children as well as allow for monitoring of geographic areas into which their children may enter. Also, the present invention provides a means for recording impulse forces experienced by a vehicle during a crash event in order to provide real-time notification to fleet management personnel as well as to provide data which may facilitate accident reconstruction and which may be used in the courtroom and by the auto insurance industry.

A recent study released by the Federal Motor Carrier Safety Administration (FMCSA) indicated that driver error was ten times more likely to be the cause of truck-related accidents as compared to other factors such as poor road conditions, weather and mechanical malfunctions. Specifically, the study indicated that certain driver factors such as speeding, inattention, fatigue and unfamiliarity with roads accounted for 88 percent of all crashes involving large trucks. As a means to reduce truck-related accidents, the FMCSA study recommended that greater attention be focused on developing systems for monitoring at-risk driver behavior in commercial motor vehicle fleets in order to improve driver safety.

Losses as a result of accidents involving large truck crashes includes property damage to vehicle and structures as well as personal injury to drivers, occupants and occasionally bystanders. In addition to the financial losses and injuries resulting from truck crashes, fleet operators incur losses as a result of excess fuel and maintenance costs, as well as losses due to inefficient management of individual vehicles in the fleet as well as groups of fleet vehicles such as those located in a specific geographic area. Fleet operators may also suffer losses as a result of vehicle theft, inefficient vehicle routing as a result of unforeseen adverse road conditions along a route, and human losses such as may occur when the driver is injured while performing extravehicular duties.

Included in the prior art are several systems which attempt to address either the problem of driver error as a cause of accidents or by attempting to reduce losses due to inefficient fleet management. For example, U.S. Patent Publication No. 2004/0039504 assigned to Fleet Management Services, Inc., discloses a fleet management information system for identifying the location and direction of movement of each vehicle in the fleet. The Fleet Management Services application discloses that each vehicle in the fleet is in communication directly with management offices in real-time to report vehicle location and heading as well as the status of certain events in which the vehicle may be engaged.

One of the stated objects of the fleet management system disclosed in the application is to improve the availability of fleet management information to owners and operators so as to improve vehicle tracking and enhanced communication within the fleet to increase asset profitability. The application indicates that the above-mentioned objects are facilitated by providing the capability to locate vehicles in the fleet in real-time as well as improving the efficiency of wireless communication within the fleet.

Although the application assigned to Fleet Management Services, Inc., as disclosed above is understood to provide improved fleet business management by minimizing gap times in time division multiple access (TDMA) networks during data transmissions, the application is not understood to address the issue of monitoring driver behavior and/or driver performance in order to improve driver safety and asset health. Furthermore, the application disclosed above is not understood to improve other aspects of fleet operation such as improving fuel economy and reducing maintenance costs of a fleet. In this regard, the application is only understood to improve communication within the fleet and is not understood to improve the amount of information available regarding the operation of each vehicle such that analysis of similar problems may be performed in order to establish trends and ultimately correct problems over time.

U.S. Pat. No. 6,124,810 issued to Segal et al. and assigned to Qualcomm, Inc. discloses a method for determining when a vehicle has arrived and departed from a specific location. More particularly, the Segal patent discloses an apparatus having an on-board mobile communication terminal for receiving destination information wirelessly from a central facility. The apparatus incorporates velocity data from a vehicle speedometer in combination with a communication satellite system in order to provide vehicle position data to a processor.

The processor, located on-board the vehicle, uses speed and position data to determine the vehicle arrival or departure times which is wireless transmitted to the central facility. Although the device of the Segal patent is understood to improve fleet efficiency due to its autonomous transmission of arrival and departure times between a vehicle and a dispatch center, the Segal patent is not understood to address the issue of reducing aggressive driver behavior such as reducing speeding which would improve fleet safety.

U.S. Pat. No. 5,638,077 issued to Martin and assigned to Rockwell International Corporation discloses a fleet management that transmits vehicle positional data to a base station with a time annotation. The positional data further includes velocity data as well as the identity of satellites observed. In this manner, the fleet management system of the Martin reference ostensibly improves fleet management capability by improving the accuracy of GPS positional and directional information. However, the device fails to address the above-noted problems associated with improving driver behavior in fleet operations in order to reduce accident rates and lower fleet operation costs.

BRIEF SUMMARY

As can be seen, there exists a need in the art for a driver mentoring system adaptable for use in commercial fleet operations that monitors at risk and/or unsafe driver behavior and provides mentoring to the driver in order to reduce adverse driver actions and inactions that may lead to accidents. In addition, there exists a need in the art for a driver mentoring system that allows for accurate vehicle tracking at a base station and which can incorporate a third party mapping database in order to provide maximum road speed data for any particular location on a road such that the driver may avoid speeding violations and/or maintain safe, legal, and established speed limits.

Furthermore, there exists a need in the art for a vehicle behavior monitoring system that records velocity and acceleration impulse forces imposed on a vehicle during a crash for use in accident reconstruction for insurance claim and courtroom purposes. Finally, there exists a need in the art for a vehicle behavior monitoring system that provides for real-time reconfiguration of driver performance and vehicle operation parameters from a base station to individual vehicles in a fleet and which allows for reporting of such data in order to generate driver profiles and trends, calculate fuel and mileage tax and create hours of service reports in compliance with federal requirements.

The present invention specifically addresses the above-mentioned needs associated with fleet management by providing a unique vehicle monitoring system specifically adapted to mentor driver performance in order to improve driver safety and reduce accident rates as well as reduce fuel and maintenance costs (as a secondary benefit to good driving behavior—driving the speed limit on paved roads and driving specified and/or configured speed limits on non-paved roads).

In another aspect of the invention, the vehicle monitoring system allows for the recording of crash impulse forces acting on the vehicle during an accident for accident reconstruction purposes and for insurance and injury claim purposes. Fleet utilization is improved by real-time or over-time tracking by GPS of all vehicles in the fleet or tracking per geographic zone, by group, and individually.

The present invention also generates automated International Fuel Tax Agreement (IFTA) reports, mileage reports, hours-of-service (HOS) reports required by the Department of Transportation (DOT) and provides real-time updates on driver behavior and vehicle operation that is accessible anywhere via the internet. Advantageously, the system is fully-configurable in all aspects and at any time including reconfiguring during installation of the system as well as during operation. For example, the invention provides a means by which fleet management can reconfigure the vehicle monitoring system by remote command in order to revise various system parameters such as the type of data to be reported and how often. Conversely, the system can be reconfigured at the vehicle in a comprehensive manner.

Two-way communication between the fleet vehicles and the base station or server allows for notification of fleet management and/or safety personnel during an emergency, during an exception event such as excessive speeding or swerving by a driver, or to allow drivers to report in at specific intervals and times or upon the occurrence of specific events.

BRIEF DESCRIPTION OF THE DRAWINGS

These and other features and advantages of the various embodiments disclosed herein will be better understood with respect to the following description and drawings wherein.

DETAILED DESCRIPTION

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
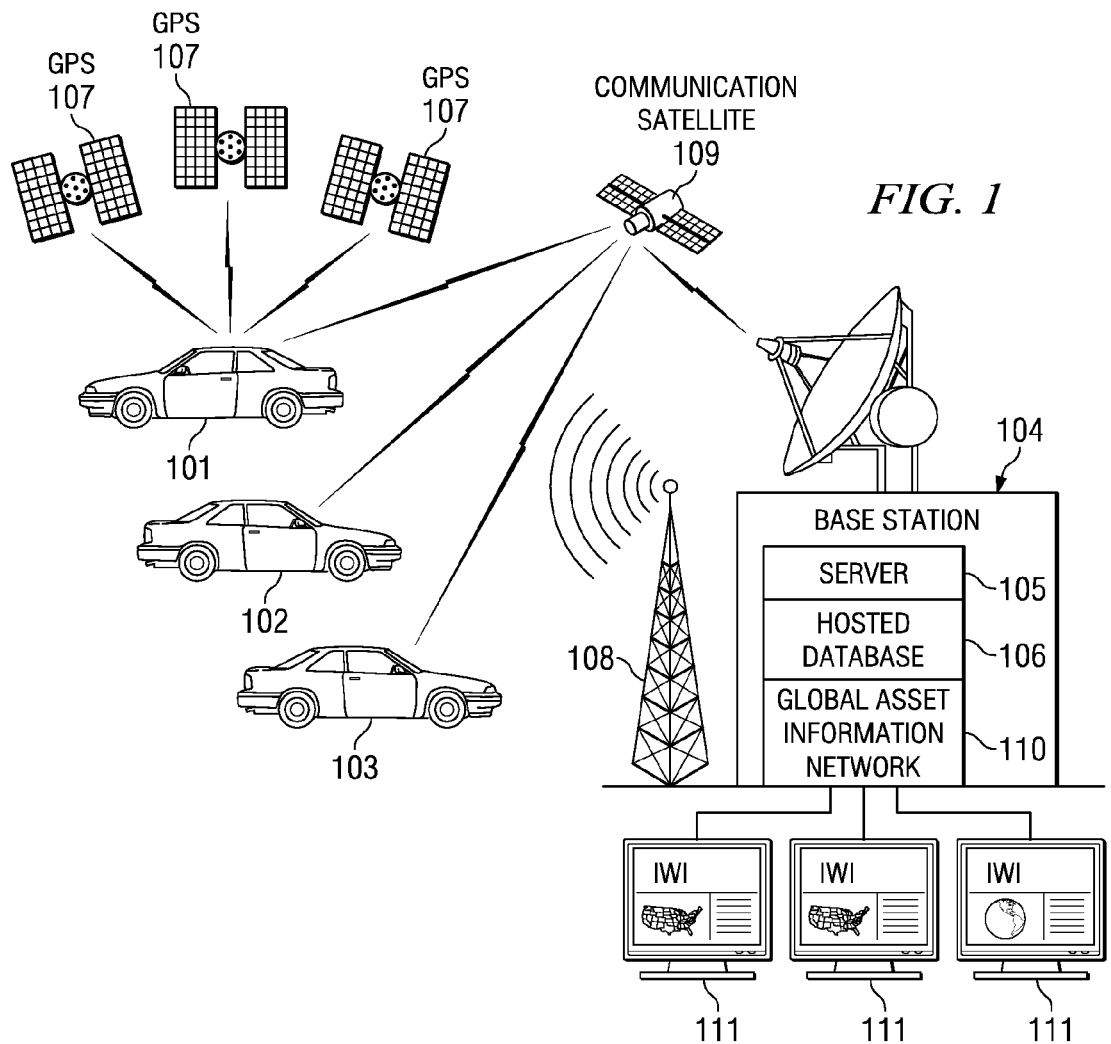
FIG. 1 is an illustration of several GPS-tracked vehicles in wireless communication with a base station having a server containing a fleet management data collection system (DCS) that is also accessible via the internet.

Referring now to the drawings wherein the showings are for purposes of illustrating preferred embodiments of the present invention and not for purposes of limiting the same, shown in FIG. 1 are several vehicles 101-103 of a fleet which are in wireless communication with a base station 104. Each of the vehicles 101-103 in the fleet preferably includes a Global Positioning System (GPS) receiver to allow tracking thereof. The base station 104 includes a server 105 containing a fleet management database 106 or data collection system (DCS) that may be accessible via a securable internet connection or at the server 105 itself.

Figure 2:
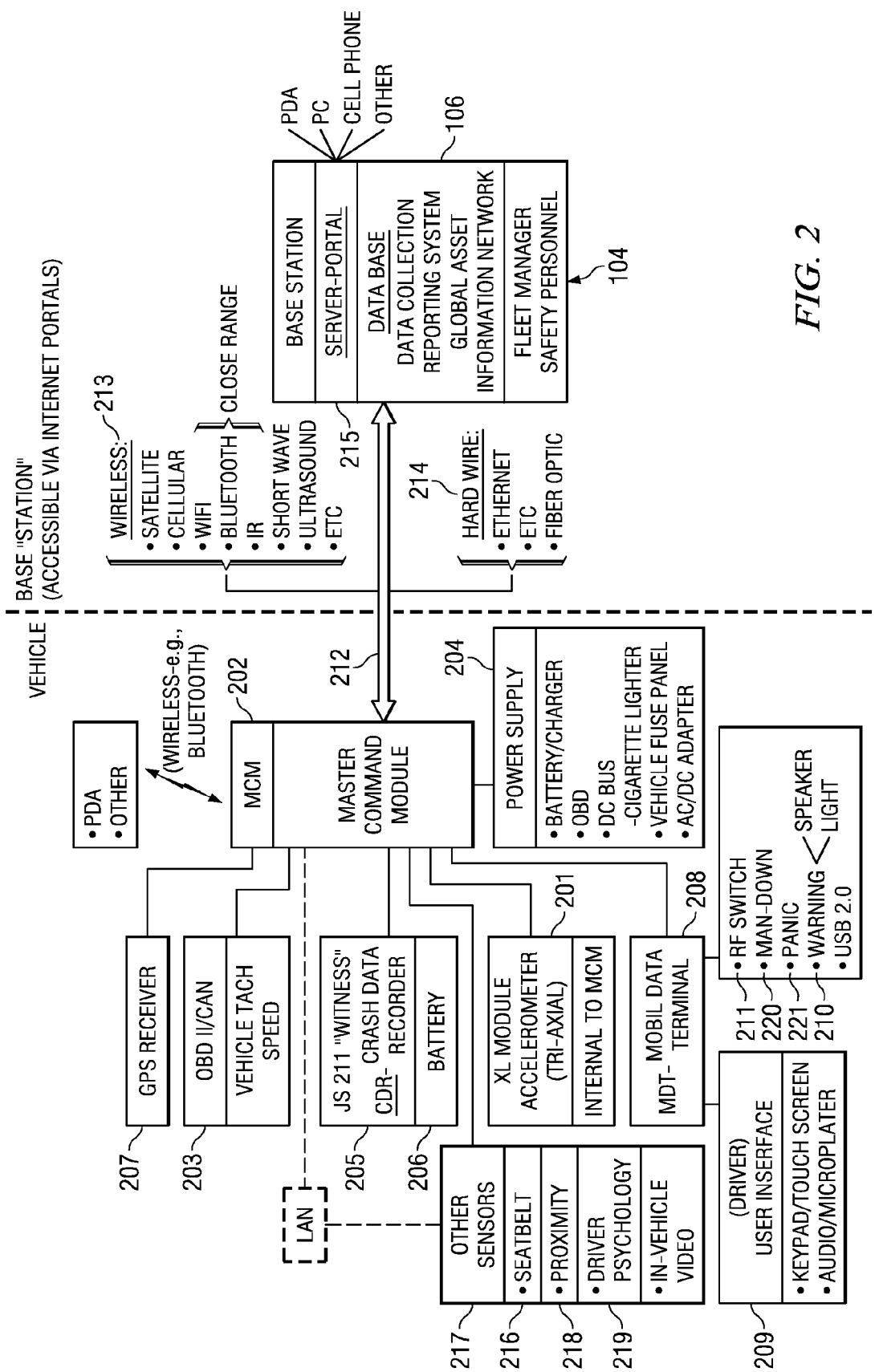
FIG. 2 is a block diagram of a vehicle monitoring system wherein each vehicle may include a GPS receiver (GPS), crash data recorder (CDR), mobile data terminal (MDT), accelerometer module (XL module) and a master command module (MCM) adapted to receive inputs therefrom for transmission to the base station for recording on the DCS and generating reports.

In one aspect of the invention, a vehicle monitoring system is provided for monitoring at least one vehicle 101-103 in the fleet as well as monitoring driver behavior in order to improve safety and reduce fuel and maintenance costs for the fleet. Driver behavior is monitored with the aid of an accelerometer module (XLM) 201 (FIG. 2) which includes at least one accelerometer for measuring at least one of lateral (sideways), longitudinal (forward and aft) and vertical acceleration in order to determine whether the driver is operating the vehicle 101-103 in an unsafe or aggressive manner.

For example, excessive lateral acceleration may be an indication that the driver is operating the vehicle 101-103 at an excessive speed around a turn along a roadway. Furthermore, it is possible that the driver may be traveling at a speed well within the posted speed limit for that area of roadway. However, excessive lateral acceleration, defined herein as "hard turns," may be indicative of aggressive driving by the driver and may contribute to excessive wear on tires and steering components as well as potentially causing the load such as a trailer to shift and potentially overturn.

Furthermore, such hard turns by a particular driver could eventually result in personal injury to the driver/occupants as well as property damage to the vehicle 101-103 and load carried thereby and damage to anything impacted by the vehicle 101-103 should it depart the roadway. Ultimately, such hard turns could result in loss of life if the vehicle is a large truck and the driver loses control resulting in a collision with a smaller vehicle such as a passenger automobile.

As such, it can be seen that monitoring and mentoring such driver behavior by providing warnings to the driver during the occurrence of aggressive driving such as hard turns can improve safety and reduce accidents. In addition, mentoring such aggressive driver behavior can reduce wear and tear on the vehicle and ultimately reduce fleet maintenance costs as well as reduce insurance costs and identify at risk drivers and driving behavior to fleet managers.

In one aspect, the vehicle monitoring system includes a master command module (MCM) 202 which may be in data communication with an on board diagnostic (OBD) II system 203 of the vehicle such as via a port. In some vehicle models, the MCM 202 is placed in data communication with a controller area network (CAN) system (bus) 203 to allow acquisition by the MCM of certain vehicle operating parameters including, but not limited to, vehicle speed such as via the speedometer, engine speed or throttle position such as via the tachometer, mileage such as via the odometer reading, seat belt status, condition of various vehicle systems including anti-lock-braking (ABS), turn signal, headlight, cruise control activation and a multitude of various other diagnostic parameters such as engine temperature, brake wear, etc.

All cars built since Jan. 1, 1996 have OBD-II systems. There are five basic OBD-II protocols in use, each with minor variations on the communication pattern between the onboard diagnostic computer and a maintenance scanner console or tool. By 2008, all vehicles sold in the United States will be required to implement the CAN bus (ISO 15765 CAN), thus eliminating the ambiguity of the existing five signaling protocols. While there are various electrical connection protocols, the command set is fixed according to the SAE J1979 standard. All OBD-II cars have a connector located in the passenger compartment easily accessible from the driver's seat, such as under the dash or behind or near the ashtray. The OBD-II standard specifies a 16-pin J1962 connector and its pinout, the electrical signaling protocols available, and the messaging format. It also includes a list of vehicle parameters to monitor and instructions regarding how to encode the data for each parameter. SAE J1962 defines the pinout of the connector and requires that pins 4 (battery ground) and 16 (battery positive) are present in all configurations.

The OBD or CAN 203 allows for acquisition of the above-mentioned vehicle parameters by the MCM 202 for processing thereby and/or for subsequent transmission to the database 106. In order to enhance reliability and extend its useful life, it is contemplated that the MCM 202 is housed in a sealable housing which may be configured to provide varying degrees of waterproof protection. For operation in extreme temperatures, a heater mechanism may be provided to the housing to enable reliable operation in cold and severe service environments. Ideally, the housing contents (e.g., MCM 202) or the housing itself is configured to withstand excessive vibration and/or shock. The MCM 202 may be mounted in any location in the vehicle such as underneath the seat. The MCM 202 may further include an external power source 204 such as a battery, fuel cell, recharger, AC/DC adapter, DC bus—accessory or cigarette lighter plug, hot lead to vehicle fuse panel, etc., for powering the MCM 202.

The vehicle monitoring system may further include a self-contained and tamper-resistant event data recorder or crash data recorder (CDR) 205 similar to that which is shown and disclosed in U.S. Pat. Nos. 6,266,588 and 6,549,834 issued to McClellan et al., (the disclosures of which are hereby incorporated by reference herein in their entirety) and which is commercially known as "Witness" and commercially available from Independent Witness, Inc. of Salt Lake City, Utah. The CDR 205 is adapted to continuously monitor vehicle motion and begin recording upon supra-threshold impacts whereupon it records the magnitude and direction of accelerations or G-forces experienced by the vehicle as well as recording an acceleration time-history of the impact event and velocity change between pre- and post-impact for a configurable duration following said impact. The recordings are time-date stamped and are providable to the MCM 202 for subsequent transmission to the server DCS 106 if accelerations exceed an impulse threshold.

In addition, the CDR 205 is configured such that data is downloadable such as via a laptop directly from the CDR 205 at the scene of the accident or the CDR itself can be removed from the vehicle for later downloading of data. As will be described in greater detail below, the data (e.g., crash impulses) recorded by the CDR 205 can be correlated to accident severity and injury potential. It is contemplated that CDR data can be combined with recording of driver behavior via the accelerometer module (XLM) 201 in order to determine the probability of crash impact as a cause of personal injury and/or property damage.

Furthermore, the CDR 205 such as that disclosed in the McClellan references is Society of Automotive Engineers (SAE) J211-compliant such that data recorded thereby is admissible in court and can be used to facilitate accident reconstruction as well as for insurance claim purposes. As was earlier mentioned, the CDR 205 is a self-contained component that includes its own power source such as a battery 206 such that the vehicle can operate regardless of the lack of power from the vehicle due to the accident.

Importantly, the XLM 201 may be integrated with the MCM 202 and mounted within the housing. The XLM 201 is operative to monitor driver performance by measuring vehicle acceleration in at least one of lateral, longitudinal and vertical directions over a predetermined time period such as over seconds or minutes. The XLM 201 may include a single uni-axial accelerometer to measure acceleration in any one of the three above-mentioned directions such as in the lateral direction.

Alternatively, the accelerometer may be a bi-axial or a tri-axial accelerometer for measuring acceleration in two or three of the above-mentioned directions or two or three uni-axial accelerometers may be combined to provide measurements. In addition, accelerometers may be oriented in the XLM 201 to measure centripetal, centrifugal, radial, tangential acceleration or acceleration in any other direction. The XLM 201 generates an input signal to the MCM 202 when measured acceleration exceeds a predetermined threshold. Similarly, the XLM 201 may be configured to monitor and record both the day-to-day driving performance as well as capture the crash pulse. Advantageously, the base station and/or MCM 202 is configured to filter out or compensate for gravitational effects on longitudinal, lateral and vertical acceleration measurements when the vehicle is moving on hilly terrain.

As was earlier noted, the vehicle monitoring system includes a GPS receiver 207 in each vehicle in the fleet and which is configured to track in at least one of real-time or over-time modes the location and directional movement of the vehicle. As is well known in the art, signals from at least three GPS satellites 107 (FIG. 1) must be received by a GPS receiver 207 in order to calculate the latitude and longitude of an asset such as a vehicle as well as allowing for tracking of vehicle movement by inferring speed and direction from positional changes. Signals from a fourth GPS satellite 107 allow for calculating the elevation and, hence, vertical movement, of the vehicle. The GPS receiver 207 provides a GPS signal to the MCM 201 which may also be transmitted to the server 105 at the base station 104 for recording into the DCS 106.

The vehicle monitoring system may further include a mobile data terminal (MDT) 208 which may be conveniently mounted for observation and manipulation by the driver such as near the vehicle dash. The MDT 208 preferably has an operator interface 209 such as a keypad, keyboard, touch screen, display screen or any suitable user input device and may further include audio input capability such as a microphone to allow voice communications. Importantly, the MDT 208 may include at least one warning mechanism 210 such as an external speaker and/or a warning light 210 for warning the driver of violation of posted speed limits and/or exceeding acceleration thresholds in lateral, longitudinal and vertical directions as an indication of hard turns, hard braking or hard vertical, respectively. In addition, the MDT 208 may include a manual RF disable switch 211 to prevent RF emissions by the vehicle monitoring system in areas that are sensitive to RF energy.

As was earlier mentioned, the MCM 202 is adapted to receive input signals from the OBD or CAN 203, GPS receiver 207, CDR 205, MDT 208 and XLM 201 and, in this regard, may be hardwired such as to the OBD 203 and XLM 201. Alternatively, because of the small distances between the components installed in the vehicle, short range wireless methods such as infrared, ultrasonic, Bluetooth, and other mediums which may link such components. Regardless of the manner of interconnection (wireless or hardwired), the MCM 202 is operative to transmit to the base station 104 an output signal 212 representative of the measured parameters provided by each component according to a rule set or logic contained within the MCM 202.

Alternatively, the logic may be entirely contained in the database 106 at the server 105 such that all processing is performed at the base station 104 and the appropriate signals transmitted back to the MCM 202. In the latter scheme, the MCM 202 and base station 104 must preferably be in continuous two-way wireless communication which, at the time of this writing, is typically not cost-effective for most fleet operators. Therefore, wireless communication between the MCM 202 and the base station 104 is based on a protocol of information criticality, cost and system availability.

For example, in emergency situations wherein the base station 104 receives a signal from the MCM 202 associated with critical data such as an emergency, signal transmission is by the most expedient and reliable means available with cost being a secondary or tertiary consideration. On the other hand, for non-critical data such as an indication of low tire pressure as provided to the MCM 202 by the OBD 203, notification is transmitted to the base station 104 by the least expensive means and during a latent transmission.

Wireless communication 213 between the MCM 202 and the base station 104 may be provided by a variety of systems including, but not limited to, WiFi, cellular network 108, satellite 109, Bluetooth, infrared, ultrasound, short wave, microwave or any other suitable method. Hardwired communication 214 may be effected at close range such as when the vehicle is within a service yard or at a base station wherein an ethernet connection may suffice.

The DCS 106 is an asset information network that is accessible through at least one server portal 215 and is configured to receive data from the MCM 202 during predetermined time intervals, on demand, during critical events, or randomly. The DCS 106 is also configured to generate reports such as graphic report (e.g., bar charts) of driver performance. The DCS 106 can also be configured to cause the MCM 202 to transmit warning signals to the vehicle during driver violations such as speeding, hard turns, hard brake, hard vertical, seatbelt violation and can also be configured to send a notification to the server 105 during predetermined events such as panic, man down, exception, accident, unauthorized vehicle movement to alert fleet management or safety personnel.

The vehicle monitoring system is configured to monitor driver speed using OBD 203 data such as speedometer, odometer, tachometer data or speed inferred from GPS data. Speeding violations may be determined by comparing vehicle speed (as provided by the OBD 203 or as inferred from GPS data) to a speed-by-street database such as a generic third-party data set similar to that commercially available from NAVTEQ of Chicago, Ill., and generating a driver violation when the vehicle speed exceeds the speed-by-street. The driver violation causes the MCM 202 to generate an audible/visual warning to the driver in order to change driver behavior over time. In this manner, the vehicle monitoring system provides for mentoring of driver behavior in order to improve safety and reduce fleet management costs.

Furthermore, the MCM 202 may be configured to determine vehicle speed such as during a turn where the vehicle is moving slower than the speed limit but the lateral acceleration levels as measured by the XLM 201 exceed the threshold values. Such a situation may occur when the driver is turning aggressively in a parking lot (i.e., hard turning). By integrating lateral acceleration over time, it is possible to determine instantaneous velocity of the vehicle at any point in the turn. Importantly, in one aspect of the invention, the generation of the warning signal to the driver starts a count-down timer wherein the vehicle monitoring system transmits an exception signal to the base station when the timer duration expires.

Alternatively, an exception signal may be generated when certain measured parameters exceed a threshold value by a large margin such as when the magnitude of the speeding violation exceeds a threshold of 100 mph. An exception signal may then be transmitted to the base station 104 such that appropriate fleet management personnel may be alerted. Such notification may be by any predetermined means and may include cell phone voice or text communication, paging, etc. In addition to the warning signal at the vehicle, the driver may likewise be contacted by cell phone, page or other radio communications regarding the exception event.

The MCM 202 may be in receipt of numerous other sensors that may provide indication of driver violations. For example, the vehicle monitoring system may include a seat sensor 216 in communication with the MCM 202 and which is operative to generate a signal when the vehicle is moving and seatbelts of vehicle occupants are unfastened. In this regard, the vehicle monitoring system may include any number of mechanical and electronic sensors 217 in data communication with the MCM and which are configured to monitor at least one of the following vehicle parameters: low battery, engine temperature, ignition on/off, headlight turn indicator usage, ABS operability, trailer electrical/mechanical malfunction, proximity forward (tailgating) and proximity rearward (objects behind) and proximity sideways (swerving and lane departures) 218. Furthermore, mechanical and electronic sensors 219 may be provided to monitor at least one of the following driver parameters: blink rate (a sleep sensor), heart rate, blood pressure and any other physiological parameters.

The vehicle monitoring system may be operative to track and generate on-demand reports of hours-of-service (HOS) (e.g., on-duty/off-duty driving times, consecutive driving days) in compliance with Federal Motor Carrier Safety Administration regulations. The vehicle monitoring system may additionally be operative to facilitate apportionment of mileage tax by tracking vehicle mileage within a given geographic region by noting state and national border crossings. In another aspect of the invention, it is contemplated that correction for mileage errors can be compensated for by re-synchronizing the MCM 202.

More specifically, because of the drift in OBD 203 mileage data due to odometer error as a result of tire wear or variations in tire pressure and/or due to inconsistencies in the GPS receiver data as a result of multi-path errors due to interference with trees and buildings or signal delay errors caused by atmospheric interference, the present invention may include a process for re-synchronizing the MCM 202 during vehicle refueling. In this manner, fuel tax may be accurately tracked in order to reduce fleet fuel costs.

The MCM 202 may automatically send certain types of signals to the base station 104. For example, the vehicle monitoring system may further include a manually/automatically-activatable timer that is configured to generate a man down signal 220 that is sent to the base station when the timer duration is exceeded. For example, in remote job site locations such as at an oil well location where it is necessary for the driver to perform certain hazardous tasks outside of the vehicle, the driver may first activate a one-hour (or other duration) timer such that failure to deactivate the timer results in a man down signal being transmitted to the base station 104 so that help may be sent to the vehicle location. A similar message may be sent to the base station 104 via a panic button 221 activated by a driver, occupant or any nearby person and may operate similar to that of a fire alarm or emergency 9-1-1 phone call wherein fleet management may send help to the vehicle location.

As was earlier mentioned, the MCM 202 may be configured to send to the base station 104 an exception signal representative of a violation of one of a plurality of parameters comprising at least one of exceeding a predetermined speed along a given route, failure to wear seatbelt, failure to activate headlights, tailgating, excessive idle time, excessive engine RPM, engine parameters, tire condition, vehicle load condition, vehicle location violation. The parameter settings (i.e., logic) of the MCM 202 may be remotely changed by commands transmitted from the base station 104 to the MCM 202. More specifically, the rule sets that comprise the hierarchy (i.e., criticality) by which signals are transmitted from the MCM 202 to the base station 104 may be revised. For example, a hierarchy of signal transmission may be revised from: panic, man down, crash event, exception, non-urgent communication to a hierarchy of crash event, man down, panic, exception, non-urgent communication.

In this same regard, the MCM 202 in one aspect of the invention is configured to allow for wireless or remote manipulation from the base station 104 of vehicle settings through the OBD or CAN 203 and may allow for revising certain vehicle settings such as engine governor setting and ignition timing. In a further aspect, the vehicle monitoring system allows for generating reports or alerts (e.g., text and/or map) of recently-occurring accident locations and dangerous road conditions such that a warning signal may be provided to the driver when the vehicle approaches the accident location or road condition. Additionally, the system can be configured to geo-fence certain areas of interest and to notify specified and/or targeted individuals when the vehicle and its driver approaches or departs a geo-fenced area. As was earlier mentioned, the database 106 is configured to collect driver performance data over time, generate a driver performance database comprising vehicle type and driver profile, and generate reports of predictive driver behavior based on historical driver performance data with the option of generating a graphical representation such as a bar chart of driver performance.

Additional modifications and improvements of the present invention may also be apparent to those of ordinary skill in the art. Thus, the particular combination of parts described and illustrated herein is intended to represent only one embodiment of the present invention and is not intended to serve as limitations of alternative devices within the spirit and scope of the present invention.

Global Asset Information Network (GAIN) 110 (FIG. 1) is a portal for fleet asset management and for monitoring driver safety. GAIN is a robust data collection and reporting system. Using an internet browser 111, fleet managers have a view into their fleet's current status. They can see all pertinent aspects of fleet operations from complex indexing and trending of aggressive driver behavior to simple location of the entire fleet. Fleet managers and safety managers can use the GAIN portal to access the information reported by the vehicle monitoring equipment. Vehicles collect the data and report in at specific times, such as a preselected interval, at random intervals, when requested, by exception, or in an emergency. Vehicles report to GAIN via satellite 109, cellular network 108, or other communications device to database 106. GAIN turns the data into actionable information providing visual reports at various levels of aggregation. The GAIN system 110 can be set to notify managers when emergencies such as panic, man down, accidents, unauthorized vehicle movement (theft) or other company selected events occur.

Figure 3:
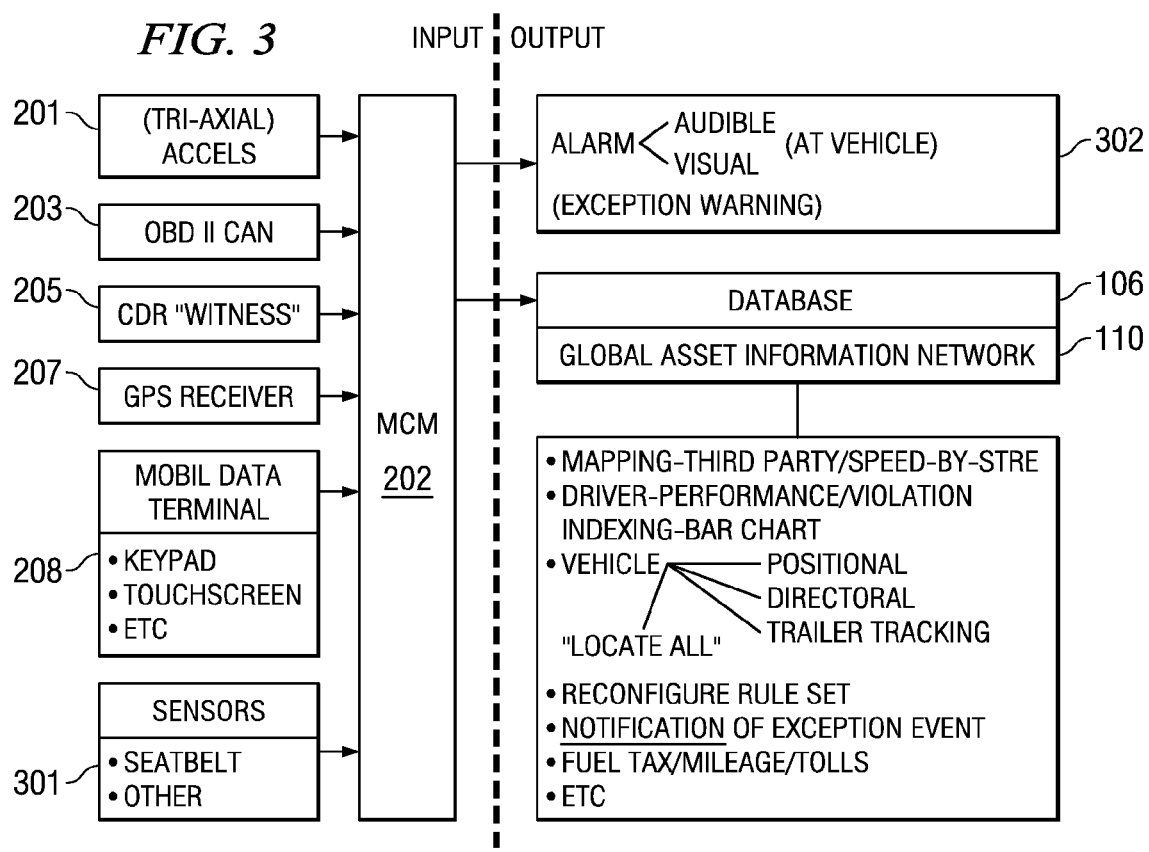
FIG. 3 is an illustration of exemplary inputs that may be provided to the MCM from the vehicle such as by an on-board diagnostic (OBD) system as well as inputs provided by the GPS receiver, the CDR, XL module, MDT and other sensors/devices and which may result in outputs from the MCM such as transmission of data to the DCS and generation of an alarm for the driver.

FIG. 3 is an illustration of exemplary inputs that may be provided to the MCM 202 from the vehicle and which may result in outputs from the MCM 202. OBD II/CAN 203 collects data from the vehicle's on-board diagnostic system, including engine performance data and system status information. GPS receiver 207 provides location information. CDR 205 provides data in the event that a crash threshold is exceeded. Accelerometers 201 provide information regarding the vehicle's movement and driving conditions. The user may provide information to MCM 202 via the mobile data terminal 208. Any number of other sensors 301, such as seat belt sensor 216, proximity sensor 218, driver monitoring sensors 219, or cellular phone use sensors, also provide inputs to MCM 202.

MCM 202 can determine when an exception condition occurs or when a threshold is exceeded that requires an alarm 302 to be generated in the vehicle. The alarm 302 may be an audible or visual warning for the vehicle occupants. Additionally, any of the data collected may be passed on to database 106 at server 105 where it may be further processed or accessed by fleet managers via GAIN system 110.

Figure 4:
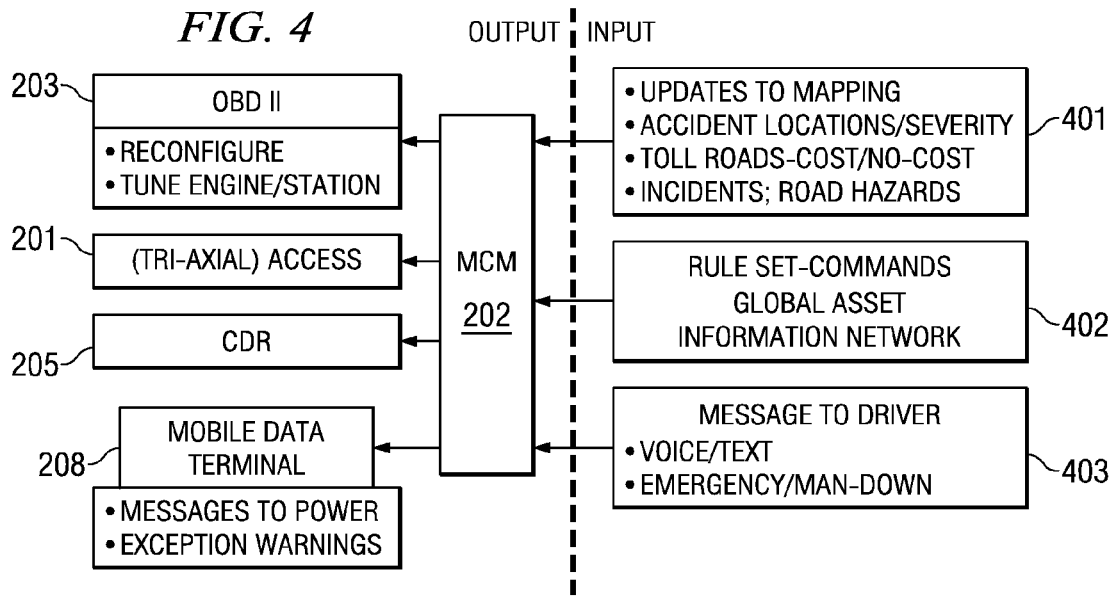
FIG. 4 is an illustration of exemplary inputs that may be provided to the MCM from the base station/server and which may include commands to reconfigure the rule set/logic of the MCM.

FIG. 4 is an illustration of exemplary inputs that may be provided to the MCM 202 from the base station 104 or server 105 and which may include commands to reconfigure the rule set/logic of the MCM 202. MCM 202 may receive mapping and routing information 401, such as mapping updates, accident information, and road information. MCM 202 may also receive instructions 402 which include updated, revised, or corrected rule sets, commands or logic to control the operation of MCM 202. Audible and visual messages 403 may also be sent via MCM 202 and then played or displayed to the driver. MCM 202 may use updated rule set 402, for example, to modify or configure the operation of vehicle systems via OBD 203. Control information may also be provided to the XLM or accelerometers 201, CDR 205, or the mobile data terminal 208.

Figure 5:
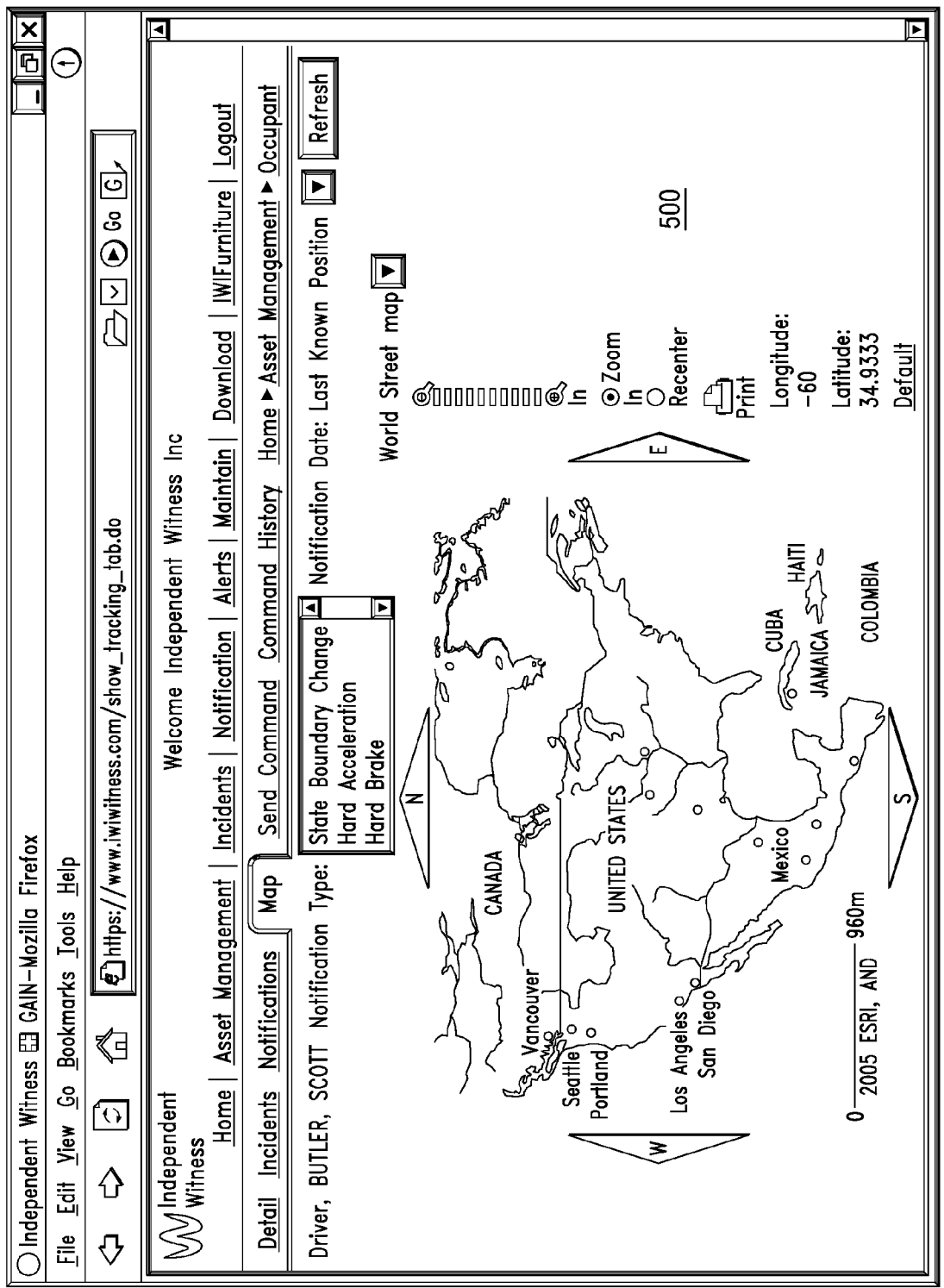
FIG. 5 is a sample graphic display of the DCS such as may be accessible from an internet portal after a user logs in and illustrating the provided capability of simultaneous viewing of driver and vehicle data such as geographic position of the vehicle as well as the ability to select from among multiple parameters for tracking vehicles and driver performance in addition to providing other options including issuing of commands to the MCM.

FIG. 5 is an example of the display 500 that may be accessible from internet portal 111 after a user logs in to GAIN system 110, for example. Display 500 provides the capability to simultaneously view driver and vehicle data, such as geographic position of the vehicle. The user also has the ability to select from among multiple parameters for tracking vehicles and driver performance in addition to providing other options including issuing of commands to the MCM 202.

In embodiments of the invention, a comprehensive driver monitoring and mentoring system installed in a vehicle has one or more of the following components. An on-board diagnostic (OBD) system operative to monitor vehicle parameters and to generate an OBD input signal representative thereof. The vehicle monitoring system may be enclosed in a sealable housing that is permanently or temporarily mountable on the vehicle. A crash data recorder (CDR) is included with the vehicle monitoring system and is configured to measure and record vehicle acceleration, including the magnitude, direction and profile of such accelerations, during a crash event and to generate CDR signals. An accelerometer module (XLM) contains at least one accelerometer, such as a tri-axial accelerometer, and is mounted within the housing. The XLM is operative to monitor driver performance by measuring acceleration in at least one of a lateral, longitudinal and/or vertical direction over a predetermined time period. The XLM generates an XL signal when acceleration exceeds a predetermined threshold. In one embodiment, the CDR and XLM may be combined so that one set of accelerometers serves both functions.

A GPS receiver mounted is preferably within the housing and is configured to track the location and directional movement of the vehicle and to generate a GPS signal. The vehicle's user may access the driver mentoring and monitoring system using a mobile data terminal (MDT), which preferably has a mechanism for communicating warnings to the user, such as a speaker or light. A master command module (MCM) mounted within the housing is operative to receive inputs from the CDR, XLM, OBD, GPS receiver, and MDT. The MCM is operative to transmit signals representative of one or more vehicle operating parameters. The MCM is further configured to generate audible and/or visual warning signals to the driver when at least one of the vehicle's movement characteristics exceed a predetermined threshold value.

A base station server is in communication with the driver mentoring and monitoring system and the MCM. The server has a data collection system (DCS) that is accessible through at least one server portal and being configured to receive data from the MCM at predetermined or random times and generate reports of driver performance. The server may also cause the MCM to transmit a warning signal to the vehicle when driver violations or exceptions are detected, such as speeding, hard turn, hard brake, hard vertical, cellular phone use, or a seatbelt violation. The MCM may send a notification to the server during other predetermined events, such as a panic alarm, man down, accident, uncorrected driver violations, or unauthorized vehicle movement.

The vehicle monitoring system is adapted to monitor driver performance and may be in continuous communication with a base station. The vehicle monitoring system comprises one or more of the following components. A self-contained CDR mountable on the vehicle and configured to measure vehicle crash impulses and generate CDR input signals representative thereof. An XL module mountable on the vehicle and operatable to measure vehicle acceleration in at least one of lateral, longitudinal and/or vertical directions and to generate XL input signals representative thereof. A mobile data terminal (MDT) mountable on the vehicle and operative to continuously transmit CDR and XL input signals from the vehicle to a base station. A driver warning device mounted on the vehicle.

In one embodiment, the base station is operative to receive the CDR input signals and to generate a crash signal when the crash impulses exceeds an impulse threshold value stored at the base station. The base station is operative to emit an alert signal at the base station to alert personnel of the accident. The base station is also operative to receive the XL input signals and generate an exception signal when vehicle acceleration exceeds an acceleration threshold value stored at the base station and transmit a command to the MDT to activate the driver warning device. The base station may have a data collection system (DCS) configured to receive data from the MCM and to record driver performance and to generate warnings for at least one of the following violations: hours of service (HOS), speeding, hard turn, hard braking, hard acceleration, hard vertical movement, failure to use seatbelt, failure to use headlights, and failure to use turn signal.

In addition to or in place of the logic contained in the base station, logic may also be included in the MCM to monitor the vehicle and driver performance and to generate warnings. The vehicle monitoring system may be in at least intermittent, if not continuous, communication with a base station. The vehicle monitoring system may comprise one or more of the following components. A self-contained CDR mountable on the vehicle and being configured to measure vehicle crash impulses and generate a crash signal when the crash impulses exceeds an impulse threshold value stored at the CDR. Software or firmware providing a methodology for collecting data at regular or non-regular intervals. An XL module mountable on the vehicle and operative to measure vehicle acceleration in at least one of lateral, longitudinal and/or vertical directions and to generate an exception signal when vehicle acceleration exceeds an acceleration threshold value stored at the XL module. A mobile data terminal (MDT) operative to intermittently transmit the crash and exception signals from the vehicle to the base station. A driver warning device may be mounted on the vehicle. The base station is operative to receive the crash and/or exception signals and to alert personnel.

The vehicle monitoring system may correlate accident data from the CDR and XL Modules to potential injuries. The present invention provides a system and method of correlating personal injury and property damage with driver behavior measured prior to a vehicle crash and impulse forces measured during the vehicle crash. The CDR may measure crash impulses and the XL module may monitor driver behavior in terms of hard turns, hard braking and hard vertical movement of the vehicle. In one embodiment of the present invention, a crash database comprising personal injury and property damage characteristics is generated. For example, characteristics of the injured person's age, gender, height, weight, occupation, hobbies, income, prior claims, physical condition, injury type and severity may be collected. Vehicle model, condition, damage type and location, as well as impact characteristics, such as acceleration magnitude and direction during the crash, change in velocity between the time of impact and at least one millisecond following impact.

The vehicle monitoring system records crash impulse forces acting upon the vehicle during the crash. Driver behavior prior to the accident is also recorded by measuring acceleration in at least one of lateral, longitudinal and/or vertical directions in order to identify hard turns, hard braking and hard vertical forces experienced by the vehicle up to the time of the accident. The vehicle crash impulse data is correlated to an injury characteristic, such as by correlating accident forces to bodily injury claims, in order to determine the probability of the vehicle crash as a causal factor of the bodily injury. The database may further include at least one of the following data sets: probability of settlement in an insurance claim filed in relation to the vehicle crash, average cost of settlement, and settlement structure.

The present invention may also be used for mentoring driver behavior using data collected from the XL module. In one embodiment, driver behavior may be monitored and/or modified in a vehicle having an OBD and/or GPS receiver and an accelerometer module, which may be an XL module containing at least one accelerometer. Preferably, the accelerometer module will be a tri-axial accelerometer. The system measures vehicle acceleration in at least one of lateral, longitudinal and/or vertical direction and may determine vehicle speed from a vehicle speedometer (via an OBD) or by inferring speed from GPS readings. The measured acceleration is compared to a predetermined threshold, and the speed is compared to a speed-by-street dataset. A warning signal is sent to the driver when the measured acceleration exceeds the threshold and/or when the speed exceeds those contained in the speed-by-street dataset. A timer may be started when the warning signal is sent to allow the driver a predetermined amount of time to reduce the acceleration or speed. A notification signal may be sent to a base station if the driver fails to reduce acceleration or speed during the predetermined amount of time. The timer may be configurable for any amount of time, including zero or no delay.

In order to provide more accurate measurements of driver behavior, in one embodiment, the present invention filters gravity out of accelerometer readings as the vehicle changes its horizontal surface orientation. Driver performance can be monitored and mentored in a vehicle having an accelerometer module, which may be an XL module containing at least one accelerometer. Preferably, the accelerometer module will be a tri-axial accelerometer. Acceleration is measured in at least one of lateral, longitudinal and/or vertical directions over a predetermined time period, which may be a period of seconds or minutes. An XL acceleration input signal is generated when a measured acceleration exceeds a predetermined threshold. Gravitational effects are filtered out of the longitudinal, lateral and vertical acceleration measurements when the vehicle is on an incline.

The present invention may also record road hazards at server database. This allows for optimization of vehicle routing in a fleet of vehicles each having a GPS receiver and a driver-activated hazard notation mechanism. The notation mechanism is activated by the driver of each vehicle when the vehicle encounters adverse road conditions, road hazards, or unsafe speed limits, for example. The notation mechanism generates a time-stamped notation signal including GPS positional data of the hazard along the road. The notation signal is transmitted to a base station for recording in a database. The location of the road hazard is then transmitted to other vehicles in the fleet.

The logic and rule sets used by the vehicle monitoring system described herein may be modified or reconfigure in real-time at the vehicle. The present invention provides for real-time revising of the reporting of vehicle behavior in a fleet management system. A base station is in communication with a fleet of vehicles each having an MCM or processor for receiving inputs from vehicle-mounted systems, including, for example, OBD, GPS receiver, CDR, MDT, and an XL module. The MCM contains an original rule set or logic for processing inputs from the vehicle-mounted systems. Commands may be transmitted from the base station to the MCM. The commands may include a revised rule set regarding processing of the inputs, such as the rules for comparing inputs to thresholds, reporting, and the like, at the MCM. The logic in the MCM is revised in response to the revised rule set command received from the base station. Inputs at the MCM are then processed according to the revised rule set. For example, the revised rule set may include a reduced lateral acceleration threshold as measured by the XL module and by which the measured lateral acceleration is compared to determine the occurrence of a driver violation. The revised rule set may also change reporting of the driver violation to the base station.

The present invention may also provide fleet location displays to a user. The location of a fleet of vehicles may be visualized in real-time on a web-based portal. The portal is linked to a server that is in communication with the vehicles. The vehicles each have an MCM for receiving inputs from vehicle-mounted systems, including an OBD, GPS receiver, CDR, MDT, and XL module. A number of display options may be selected for displaying the location of the vehicles on a geographic area or map. The options include, for example, displaying an entire fleet of vehicles, an individual vehicle in the fleet, a group of vehicles in the fleet wherein the vehicles are grouped by a predetermined set of criteria, such as by type of vehicle or load, vehicles in the fleet reporting exceptions to the base station with a previous time period of predetermined duration, or vehicles within a specific geographic zone.

The present invention also provides for modification of reporting intervals by the vehicle monitoring system. The reporting of fleet vehicle behavior characteristics to a base station or server may be configured in different ways. The following options are examples of vehicle behavior reporting characteristics: at predetermined time intervals, at random time intervals, upon request from the base station, upon occurrence of an exception, upon the occurrence of an emergency or specific event, such as panic alarm, man down, or theft. The reporting may be provided at the vehicle and/or at the base station by means of one of the following: e-mail, cell phone voice and/or text message, or pager message. The reporting includes the following driver violations, if they have occurred, hours of service, speeding, hard turn, hard braking, hard vertical, or failure to use seatbelt.

Figure 6:
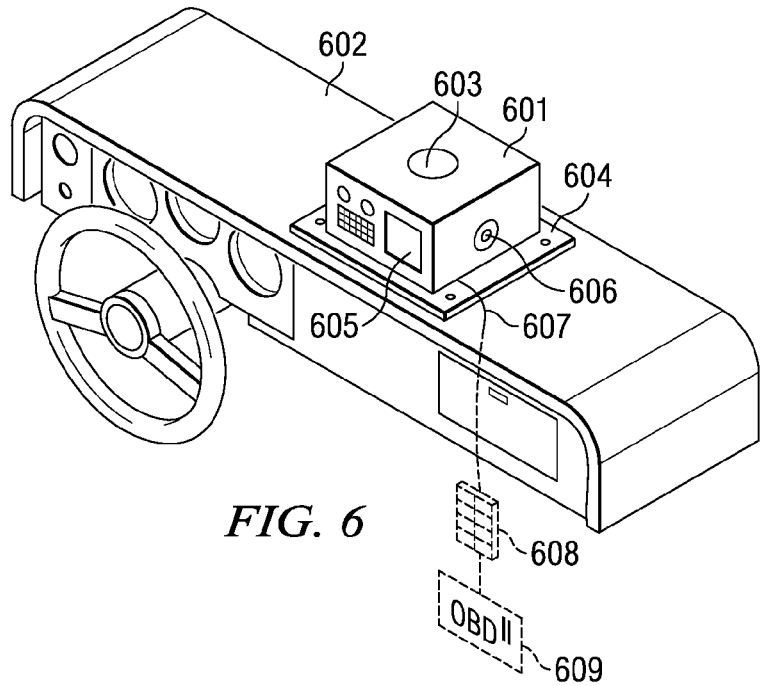
FIG. 6 illustrates a vehicle monitoring system installed in a vehicle according to one embodiment of the invention.

In one embodiment, the vehicle monitoring system of the present invention is an easily installed, all-in-one unit. Referring to FIG. 6, vehicle monitoring system 601 is installed on dashboard 602 of a vehicle. Vehicle monitoring system 601 provides all or some of the above-described vehicle and driver monitoring features in a small package. Vehicle monitoring system 601 is preferably positioned on dashboard 602 so that antenna 603 has an unobstructed exposure to the sky through a window, such as the windshield, of the vehicle. It will be understood that the windshield may be the front or rear window of the vehicle, and that the system 601 may be mounted at positions other than the dashboard in other embodiments. Antenna 603 may be a GPS antenna and/or a communication antenna. Alternatively, multiple antennas may be placed on the monitoring system 601. By placing monitoring system 601 on the dashboard, antenna 603 will be in an optimize position within the vehicle to allow system 601 to communicate with or transmit/receive signals to/from satellites, wireless network or cellular system towers, WiFi network, or other communication systems.

Vehicle monitoring system 601 may be securely mounted on dashboard 602, such as by a mounting bracket or Velcro 604. Alternatively, monitoring system may be positioned on dashboard 602 without using any attachment device as long as it does not move during operation of the vehicle. Accordingly, system 601 can be moved to different locations within the vehicle, if desired, or may be easily moved between different vehicles. However, during operation of the vehicle, it is important that vehicle monitoring system 601 be secured to the vehicle so that system 601 can properly measure and evaluate the vehicle's operating parameters, such as accelerations and location.

Vehicle monitoring system 601 may have any type of user interface 605, such as a screen capable of displaying messages to the vehicle's driver or passengers, and a keyboard, buttons or switches that allow for user input. User interface 605 may have one or more status LEDs or other indicators to provide information regarding the status of the device's operation, power, communications, GPS lock, and the like. Additionally, the LEDs or other indicators may provide feedback to the driver when a driving violation occurs. The monitoring system may also provide for emergency communications, such as a one-touch help (emergency/911) button on the user interface 605. Additionally, monitoring system 601 may have a speaker and microphone 606 integral to the device.

Monitoring system 601 may be self-powered, such as by a battery, or powered by the vehicle's battery. Access to the vehicle's batter power may be by accessing the power available on the vehicle's OBD and/or CAN bus. Power line 607 may connect to OBD connector 608, which is linked to OBD 609. Alternatively, power line 607 may be spliced or connected directly into the OBD bus during the installation of vehicle monitoring system 601. The noise and quality of the power available from the OBD or CAN bus is typically much better than the power that is directly available from the battery or other places in the vehicle's electrical system. By connecting to OBD 609, monitoring system 601 is able to obtain a minimum level of "clean" and reliable power for operation. On the other hand, vehicle monitoring system 602 is designed to limit the power drain on the OBD bus to prevent damage or adverse impact to the vehicle's OBD system.

Vehicle mounting system 601 may be easily mounted on the windshield 602 in any typical vehicle and easily connected to the OBD/CAN power supply. This would allow for monitoring of almost any vehicle, such as a fleet vehicle or private car, and for monitoring and mentoring of any driver, such as a fleet driver, teen driver, or driver using a particular insurance company, with little or no impact on the vehicle or the driver.

Vehicle monitoring system 601 is preferably self-orienting, which allows it to be mounted in any position, angle or orientation in the vehicle or on dashboard 602. The self-orienting capability gives drivers, installers and fleet owners more flexibility in deciding how and where to mount vehicle monitoring system 601. When vehicle monitoring system 601 is first installed on dashboard 602 or in some other location in the vehicle, it may be oriented at any angle or rotation. For example, dashboard 602 may be sloped so that system 601 may be mounted with some degree of pitch relative to the earth's surface. Therefore, system 601 cannot assume that the bottom of the device is parallel to the ground or that gravity acts perpendicular to the device. Furthermore, system 601 may not be aligned with the direction of movement of the vehicle, but instead may be mounted in a position such that user interface 605 is rotated to face the driver. Accordingly, system 601 cannot default to a setting that assumes that the device 601 is aligned with or parallel to the centerline of the vehicle. An incorrect assumption as to the alignment and orientation of device 601 may result in erroneous measurements of the vehicle's acceleration, orientation, location and movement.

Figure 7:
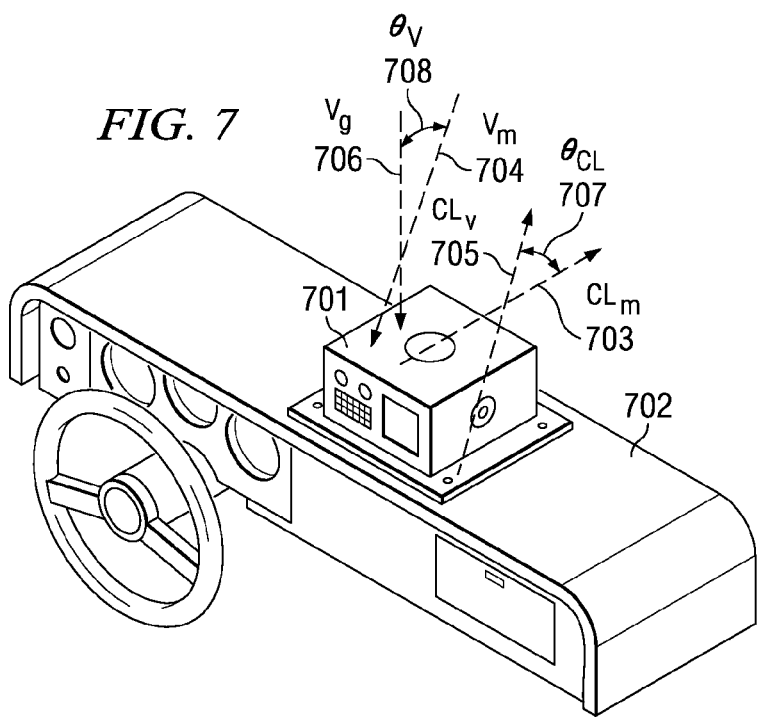
FIG. 7 illustrates is a vehicle monitoring system installed in a vehicle according to another embodiment of the invention.

In embodiments of the present invention, vehicle monitoring system is self-orienting, which allows it to determine a direction of gravity and a direction of vehicle movement. Using these two directional vectors, the monitoring system can determine the actual orientation of the device with respect to the vehicle. FIG. 7 illustrates vehicle monitoring unit 701 installed on dashboard 702 of a vehicle according to another embodiment of the invention. Three-axis accelerometers are fixedly mounted within unit 701. The monitoring system knows the orientation of the accelerometers with respect to the centerline of the monitoring unit $CL_m$ 703 and with respect to the vertical axis of the unit $V_m$ 704. If monitoring unit 701 is installed such that it is not flat and not oriented parallel with the centerline of the vehicle, then the accelerometers in unit 701 may misinterpret any detected movement. For example, if the centerline $CL_m$ 703 of unit 701 does not align with the centerline $CL_V$ 705 of the vehicle, then the accelerometers in monitoring unit 701 may incorrectly interpret an acceleration as a turn or a turn as an acceleration because of the offset $\iota_{CL}$ 707 between the accelerometer orientation and the vehicle's orientation.

To compensate for the mounting position of monitoring unit 701, a self-orienting application is started after installation. The self-orientation determines the mounting position of unit 701 and calculates how to compensate for that unit's particular installation orientation. The accelerometers in unit 701 determine gravity vector $V_g$ 706 by observing the forces on the accelerometers when the vehicle is stopped. The only force on the vehicle should be a 1 G pull from gravity. The monitoring system can measure and store the gravity vector $V_g$ 706 as reference for the vertical positioning of unit 701. The monitoring system can then calculate an offset angle $\Theta_m$ 708 representing the angular difference between vertical axis $V_m$ 704 and gravity vector $V_g$ 706.

After the vehicle begins to move, monitoring system 701 can determine the orientation of the centerline $CL_V$ 705 of the vehicle by observing forces that occur while the vehicle is moving. When a vehicle begins to move or is breaking, the vehicle is usually traveling in a straight line along $CL_V$ 705. The braking forces may be more noticeable to unit 701 because drivers often brake harder than they accelerate. Accordingly, it is typical for breaking or vehicle deceleration to be a stronger force than a normal acceleration. By measuring the breaking, vehicle acceleration, or both types of force, the accelerometers in monitoring system 701 can determine the orientation of vehicle centerline $CL_V$ 705. The monitoring system can then calculate an offset angle $\Theta_{CL}$ 707 representing the angular difference between centerline of the monitor $CL_m$ 703 and the centerline of the vehicle $CL_V$ 705.

Measurement of gravity vector $V_g$ 706 could be accomplished almost instantaneously in a vehicle that is stopped. However, it may take varying amounts of time to determine vehicle $CL_V$ 705 because that is based upon how the vehicle is moving. If the vehicle brakes hard a number of times in a straight line after the self-aligning application begins, then vehicle $CL_V$ 705 can be determined quickly. It may take longer to identify vehicle $CL_V$ 705, if the vehicle does not experience accelerations or decelerations of sufficient magnitude. Once the offset angles $\Theta_{CL}$ 707 and $\Theta_m$ 708 can then be used as a reference framework to convert observed acceleration measurements at monitoring unit 701 to the actual accelerations experienced by the vehicle. In most embodiments, the self-orienting application will only need to be run one time after installation; however, the self-orienting application may run continuously or periodically to update the orientation of unit 701, if necessary.

Figure 8:
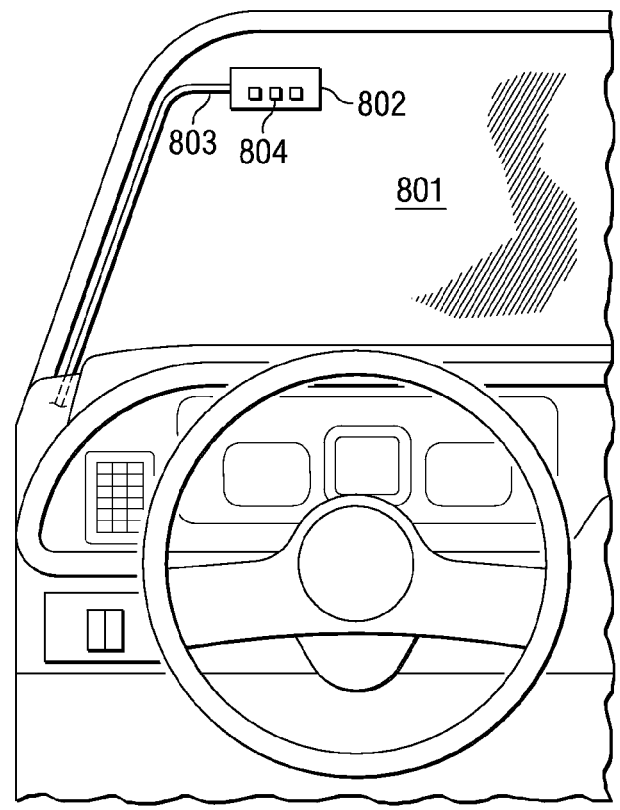
FIG. 8 illustrates an alternative vehicle monitoring system installed in a vehicle according to embodiments of the invention.

FIG. 8 illustrates an alternative embodiment of vehicle monitor 802 which is mounted directly to windshield 801. Monitor 802 may be affixed to windshield in any appropriate manner such as by glue or by Velcro glued to windshield 801 and to monitor 802. Monitor 802 may be permanently or removably mounted on windshield 801. Vehicle monitor 802 may be powered by an internal battery or by the vehicle's battery. In a preferred embodiment, monitor 802 is powered by an on-board diagnostic system, such via an OBD II or CAN bus, or any electronic control unit or electronic control monitor system in the vehicle. Cable 803 is a power and/or cable used in one embodiment of the invention. Cable 803 may be coupled to the on-board diagnostic system bus to provide power to monitor 802. Additionally, cable 803 may provide data from the on-board diagnostic system, such as vehicle speed, engine parameters, to monitor 802.

Monitor 802 may includes any of the vehicle monitoring systems described herein or other features. Monitor 802 may be a self-orienting device that uses gravity and movement of the vehicle to determine its orientation relative to the vehicle as described herein. Monitor 802 may also include GPS capability to determine the vehicle's location and may use changes in the vehicle's location over time to determine vehicle speed. Monitor 802 may also incorporate accelerometers to identify aggressive driving and/or collisions. Warning indicators and input buttons 804 may include a one-touch help or emergency/911 button and may include at least one status LED for operations, power, communications, GPS lock, and driving violation. Monitor 802 may also include a speaker and a microphone internally for communication between the driver and a remote location and/or for providing audible warnings to the driver. Monitor 802 may also include a screen for displaying text or iconic messages and warnings to the driver.

It will be understood that the present invention may be used for both fleets of vehicles and for individual drivers. For example, the vehicle monitoring system described herein may be used by insurance providers to monitor the driving behavior of customers and to use collected data to set insurance rates. A private vehicle owner may also use the present invention to monitor the use of the vehicle. For example, a parent may use the system described herein to monitor a new driver or a teenaged driver.

The present system provides for improved safety and asset monitoring and management. In one embodiment, the vehicle monitoring system may include as few features as a wireless communication module and a GPS module. The communication module may be a cellular phone, satellite communication system, WiFi communication device, or any other wireless communication system. The GPS module would provide location information for the vehicle. This system could be installed in a vehicle, such as on a windshield or dashboard, and would transmit vehicle information to a central location regarding vehicle use. The system could accept inputs from an on-board diagnostic system, such as vehicle speed, engine parameters, or the like. The system could also be powered by the on-board diagnostic system or by the vehicle's battery or using its own power source. A housing may comprise both the wireless communication module and the GPS module. The housing may also comprise antennas for the communication and GSP modules. When mounted on a windshield, the antennas would be optimally positioned so that they are exposed to open sky and not obstructed by the vehicle. The housing could also be mounted on the vehicle dashboard.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A monitoring device for monitoring an operation of a vehicle, the monitoring device being configured for determining and using a relative orientation of the monitoring device, relative to the vehicle, for facilitating accurate monitoring of the vehicle, the monitoring device comprising:
a housing having a vertical orientation defined by a vertical axis and a horizontal orientation defined by a housing centerline;
an accelerometer unit with at least one accelerometer;
at least one processor which is communicatively coupled to the accelerometer unit; and
an accelerometer module with computer-executable instructions configured to perform, when executed by the at least one processor, self-orienting of the monitoring device relative to the vehicle, wherein the self-orienting includes:
observing one or more gravitational forces on the at least one accelerometer when it is determined that the vehicle is stopped;
using the one or more observed gravitational forces to determine a gravity vector;
calculating a first offset angle representing an angular difference between the gravity vector and the vertical axis of the housing;
identifying one or more acceleration measurements detected by the at least one accelerometer while the vehicle is moving;
using the one or more acceleration measurements to determine a line in which the vehicle is moving and associating the line in which the vehicle is moving with a centerline of the vehicle; and
calculating a second offset angle representing an angular difference between the centerline of the vehicle and the housing centerline.

2. The monitoring device of claim 1, wherein the monitoring device is further configured to convert the one or more new acceleration measurements detected by the monitoring device into calculated accelerations experienced by the vehicle by using at least one of the first offset angle or the second offset angle.

3. The monitoring device of claim 1, wherein the monitoring device is further configured to convert the one or more new acceleration measurements detected by the monitoring device into calculated accelerations experienced by the vehicle by using both of the first offset angle and the second offset angle.

4. A monitoring system for monitoring an operation of a vehicle, the monitoring system comprising:
   a monitoring device that is configured for determining and using a relative orientation of the monitoring device, relative to the vehicle, for facilitating accurate monitoring of the vehicle, wherein the monitoring device comprising:
   a housing having a vertical orientation defined by a vertical axis and a horizontal orientation defined by a housing centerline;
   an accelerometer unit with at least one accelerometer;
   at least one processor which is communicatively coupled to the accelerometer unit; and
   an accelerometer module with computer-executable instructions configured to perform, when executed by the at least one processor, self-orienting of the monitoring device relative to the vehicle, wherein the self-orienting includes:
      observing one or more gravitational forces on the at least one accelerometer when it is determined that the vehicle is stopped;
      using the one or more observed gravitational forces to determine a gravity vector;
      calculating a first offset angle representing an angular difference between the gravity vector and the vertical axis of the housing;
      identifying one or more acceleration measurements detected by the at least one accelerometer while the vehicle is moving;
      using the one or more acceleration measurements to determine a line in which the vehicle is moving and associating the line in which the vehicle is moving with a centerline of the vehicle; and
      calculating a second offset angle representing an angular difference between the centerline of the vehicle and the housing centerline.

5. The system of claim 4, further comprising:
   a speaker on the housing of the monitoring device for broadcasting messages to a user.

6. The system of claim 4, further comprising:
   a microphone on the housing of the monitoring device for receiving speech from a user.

7. The system of claim 4, further comprising:
   a one-touch emergency button on the housing of the monitoring device for alerting a remote location when a user or the vehicle is experiencing an emergency.

8. The system of claim 4, further comprising:
   a screen for displaying text or iconic messages to a user.

9. The system of claim 4, further comprising:
   a keypad for providing user input to the system.

10. The system of claim 4, further comprising:
    one or more LED lights on the housing of the monitoring device for providing status information.

11. The system of claim 10, wherein the LED lights provide status information associated with one or more of a system operation, a power status, a communications status, a GPS lock, and a driving violation.

12. The system of claim 4, wherein, after installation, the system initiates the self-orienting.

13. The system of claim 4, wherein the accelerometer unit comprises a three-axis accelerometer for measuring lateral, longitudinal and vertical accelerations.

14. The system of claim 4, wherein the housing of the monitoring device is mounted within the vehicle so that a GPS antenna of the monitoring device has an unobstructed exposure to the sky.

15. The system of claim 4, further comprising:
    a communication unit for communicating with a base station; and
    an antenna coupled to the communication unit.

16. The system of claim 15, wherein the communication unit provides one or more communications from the group consisting of:
    satellite communications;
    cellular communications;
    WiFi communications; and
    RF communications.

17. The monitoring device of claim 1, wherein the monitoring device is further configured to repeatedly perform the self-orienting of the monitoring device relative to the vehicle after being mounted in the vehicle on a predetermined periodic basis.

18. The monitoring device of claim 1, wherein the one or more acceleration measurements used to determine a line in which the vehicle is moving comprise one or more acceleration measurements detected while the vehicle is decelerating rather than accelerating.

19. A monitoring system for monitoring an operation of a vehicle, the monitoring system comprising:
    a monitoring device that is configured for determining and using a relative orientation of the monitoring device, relative to the vehicle, for facilitating accurate monitoring of the vehicle, wherein the monitoring device comprising:
    a housing having a vertical orientation defined by a vertical axis and a horizontal orientation defined by a housing centerline;
    an accelerometer unit with at least one accelerometer;
    at least one processor which is communicatively coupled to the accelerometer unit; and
    an accelerometer module with computer-executable instructions configured to perform, when executed by the at least one processor, self-orienting of the monitoring device relative to the vehicle, wherein the self-orienting includes:
       observing one or more gravitational forces on the at least one accelerometer;
       using the one or more observed gravitational forces to determine a gravity vector;
       calculating a first offset angle representing an angular difference between the gravity vector and the vertical axis of the housing;
       identifying one or more acceleration measurements detected by the at least one accelerometer while the vehicle is moving;
       using the one or more acceleration measurements to identify a centerline of the vehicle; and
       calculating a second offset angle representing an angular difference between the centerline of the vehicle and the housing centerline.

20. The system of claim 4, wherein the monitoring device is further configured to monitor the following operations:
    hard turns;
    hard braking;
    hard vertical;
    excessive acceleration;
    hours of service (HOS);
    speeding;
    failure to use seatbelt;

failure to use headlights; and
failure to use turn signal.

21. The system of claim 20, wherein the system notifies a driver when a threshold of at least one predetermined vehicle operation parameter has been exceeded for any of the operations identified in claim 20.

22. A computer implemented method for a monitoring system to self-orient a monitoring device relative to a vehicle, wherein the monitoring device includes:
   a housing having a vertical orientation defined by a vertical axis and a horizontal orientation defined by a housing centerline;
   an accelerometer unit with at least one accelerometer;
   at least one processor which is communicatively coupled to the accelerometer unit; and
   an accelerometer module with computer-executable instructions configured to perform, when executed by the at least one processor, the method of self-orienting the monitoring device relative to the vehicle,
   wherein the method includes:
      observing one or more gravitational forces on the at least one accelerometer when it is determined that the vehicle is stopped;
      using the one or more observed gravitational forces to determine a gravity vector;
      calculating a first offset angle representing an angular difference between the gravity vector and the vertical axis of the housing;
      identifying one or more acceleration measurements detected by the at least one accelerometer while the vehicle is moving;
      using the one or more acceleration measurements to determine a line in which the vehicle is moving and associating the line in which the vehicle is moving with a centerline of the vehicle; and
      calculating a second offset angle representing an angular difference between the centerline of the vehicle and the housing centerline.

23. The method of claim 22, wherein the method is performed at the monitoring device.

24. The monitoring system of claim 4, wherein the monitoring device is further configured to repeatedly perform the self-orienting of the monitoring device relative to the vehicle after being mounted in the vehicle on a predetermined periodic basis.

25. The monitoring system of claim 4, wherein the one or more acceleration measurements used to determine a line in which the vehicle is moving comprise one or more acceleration measurements detected while the vehicle is decelerating rather than accelerating.

26. The monitoring system of claim 4, wherein the monitoring system is a distributed system that includes at least one computing system that is remotely located over a wireless network in communication with the monitoring device.

27. The monitoring system of claim 4, wherein the monitoring device is further configured to convert the one or more new acceleration measurements detected by the monitoring device into calculated accelerations experienced by the vehicle by using at least one of the first offset angle or the second offset angle.

28. The monitoring system of claim 4, wherein the monitoring device is further configured to convert the one or more new acceleration measurements detected by the monitoring device into calculated accelerations experienced by the vehicle by using both of the first offset angle and the second offset angle.

* * * * *